United States Patent
Isomura et al.

(10) Patent No.: US 11,238,046 B2
(45) Date of Patent: Feb. 1, 2022

(54) INFORMATION MANAGEMENT DEVICE, INFORMATION MANAGEMENT METHOD, AND INFORMATION MANAGEMENT PROGRAM

(71) Applicant: NIPPON TELEGRAPH AND TELEPHONE CORPORATION, Tokyo (JP)

(72) Inventors: Atsushi Isomura, Musashino (JP); Takashi Kubo, Musashino (JP); Ichibe Naito, Musashino (JP); Masayuki Hanadate, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/970,387

(22) PCT Filed: Feb. 18, 2019

(86) PCT No.: PCT/JP2019/005769
§ 371 (c)(1),
(2) Date: Aug. 17, 2020

(87) PCT Pub. No.: WO2019/160133
PCT Pub. Date: Aug. 22, 2019

(65) Prior Publication Data
US 2021/0109925 A1    Apr. 15, 2021

(30) Foreign Application Priority Data

Feb. 19, 2018 (JP) .............................. JP2018-027368
Jul. 6, 2018 (JP) .............................. JP2018-129528
Feb. 6, 2019 (JP) .............................. JP2019-020118

(51) Int. Cl.
*G06F 16/22* (2019.01)
*G06F 16/2455* (2019.01)
(Continued)

(52) U.S. Cl.
CPC .......... *G06F 16/2455* (2019.01); *G06F 16/22* (2019.01); *G06F 16/23* (2019.01); *G06F 16/284* (2019.01)

(58) Field of Classification Search
CPC ...... G06F 16/2455; G06F 16/22; G06F 16/23; G06F 16/284
(Continued)

(56) References Cited

U.S. PATENT DOCUMENTS

| 7,805,460 B2* | 9/2010 | Artan | G06F 21/564 |
| | | | 707/791 |
| 8,190,630 B2* | 5/2012 | Nakadai | H04L 45/745 |
| | | | 707/769 |

(Continued)

FOREIGN PATENT DOCUMENTS

JP    2014-002519 A    1/2014

OTHER PUBLICATIONS

International Search Report and Written Opinion dated Mar. 19, 2019 for PCT/JP2019/005769 filed on Feb. 18, 2019, 11 pages including English Translation of the International Search Report.
(Continued)

*Primary Examiner* — Hanh B Thai
(74) *Attorney, Agent, or Firm* — Xsensus LLP

(57) ABSTRACT

An information management device includes a memory, and processing circuitry coupled to the memory and configured to convert said spatio-temporal information in storage object information into a one-dimensional bit string, split the converted one-dimensional bit string into an upper bit string and a lower bit string, and cause a storage target node to
(Continued)

store at least the split upper bit string in a key and to store the split lower bit string and said associated data in a value of that key, and convert a range condition of spatio-temporal information of an object to be retrieved into one-dimensional bit string, split the converted one-dimensional bit string into an upper bit string and a lower bit string, retrieve a key from a search target node using at least the split upper bit string, and retrieve a value corresponding to the split lower bit string from values of the retrieved key.

7 Claims, 31 Drawing Sheets

(51) Int. Cl.
  *G06F 16/23* (2019.01)
  *G06F 16/28* (2019.01)
(58) Field of Classification Search
  USPC .......................................................... 707/769
  See application file for complete search history.

(56) References Cited

U.S. PATENT DOCUMENTS

| | | | | |
|---|---|---|---|---|
| 8,712,977 | B2* | 4/2014 | Kataoka | G06F 16/90335 |
| | | | | 707/693 |
| 10,469,839 | B2* | 11/2019 | Moriya | H04N 19/13 |
| 10,574,258 | B1* | 2/2020 | Albel | H03M 3/48 |
| 2002/0035660 | A1* | 3/2002 | Tikkanen | G06F 16/9027 |
| | | | | 711/1 |
| 2004/0130467 | A1* | 7/2004 | Nakagawa | H04L 25/4915 |
| | | | | 341/58 |
| 2004/0215609 | A1* | 10/2004 | Takatsu | H04L 45/7457 |
| 2006/0115116 | A1* | 6/2006 | Iwasaki | G06K 9/00348 |
| | | | | 382/103 |
| 2007/0100967 | A1* | 5/2007 | Smith | G06F 8/20 |
| | | | | 709/219 |
| 2008/0133583 | A1* | 6/2008 | Artan | H04L 63/1416 |
| 2010/0131476 | A1* | 5/2010 | Kataoka | G06F 16/90335 |
| | | | | 707/693 |
| 2010/0131550 | A1* | 5/2010 | Nakadai | H04L 45/745 |
| | | | | 707/769 |
| 2010/0332514 | A1* | 12/2010 | Steele | G06F 7/02 |
| | | | | 707/769 |
| 2011/0066638 | A1* | 3/2011 | Shinjo | G06F 16/90344 |
| | | | | 707/769 |
| 2011/0161357 | A1* | 6/2011 | Kataoka | H03M 7/40 |
| | | | | 707/769 |
| 2012/0179710 | A1* | 7/2012 | Hanai | G06F 16/24522 |
| | | | | 707/769 |
| 2012/0209855 | A1* | 8/2012 | Shinjo | G06F 16/322 |
| | | | | 707/745 |
| 2012/0240098 | A1* | 9/2012 | Souza | G06F 8/20 |
| | | | | 717/104 |
| 2013/0063568 | A1* | 3/2013 | Silverbrook | G06T 3/0006 |
| | | | | 348/46 |
| 2013/0339371 | A1* | 12/2013 | Hayashi | G06F 16/9537 |
| | | | | 707/743 |
| 2015/0100593 | A1* | 4/2015 | Underkoffler | G06K 9/00973 |
| | | | | 707/755 |
| 2015/0213125 | A1* | 7/2015 | Shim | G06F 16/2457 |
| | | | | 707/741 |
| 2015/0341668 | A1* | 11/2015 | Lee | H04N 19/91 |
| | | | | 375/240.12 |
| 2015/0356128 | A1* | 12/2015 | Nishimura | G06F 16/2237 |
| | | | | 707/745 |
| 2017/0171543 | A1* | 6/2017 | Moriya | H04N 19/13 |
| 2018/0077429 | A1* | 3/2018 | Lee | A47J 39/02 |
| 2019/0042612 | A1* | 2/2019 | Hayashi | G06F 16/2264 |
| 2019/0146987 | A1* | 5/2019 | Bhave | H04L 43/14 |
| | | | | 707/754 |
| 2020/0357483 | A1* | 11/2020 | Roquet | G16H 50/30 |

OTHER PUBLICATIONS

"What is a Relational Database?," Amazon Web Services, Retrieved from Internet URL: https://aws.amazon.com/relational-database/?nc1=h_ls, on Jul. 6, 2020, pp. 1-6.

Jezek, J. and Kolingerova, I., "STCode: The Text Encoding Algorithm for Latitude/Longitude/Time," Connecting a Digital Europe Through Location and Place, Springer Link, pp. 163-177, Retrieved from the Internet URL: https://link.springer.com/chapter/10.1007%2F978-3-319-03611-3_10, on Jan. 11, 2018 (with Abstract only).

Redis, "Secondary indexing with Redis," Retrieved from the Internet URL: https://redis.io/topics7indexes, on Jan. 11, 2018, 18 pages.

Kuramata, Y., "NoSQL suitable for IoT, dispersion Key-Value store," Amazon Web Services, Retrieved from the Internet URL: https://thinkit.co.jp/story/2014/09/25/5280?page=0%2C1, on Jan. 11, 2018, 8 pages (with English Translation).

Shoji Nishimura et al: "MD-HBase: design and implementation of an elastic data infrastructure for cloud-scale location services", Distributed and Parallel Databases, vol. 31, No. 2, Sep. 5, 2012 (Sep. 5, 2012), pp. 289-319, XP055236444.

Extended European Search Report dated Sep. 29, 2021, in corresponding European Patent Application No. 19754451.3.

* cited by examiner

Fig. 3

| NODE | KEY | VALUE ||
| | | SECONDARY INDEX PORTION | DATA PORTION |
|---|---|---|---|
| 1 | UPPER BIT STRING 1 | LOWER BIT STRING 1 | data1 |
| | | LOWER BIT STRING 2 | data2 |
| | | ... | ... |
| | UPPER BIT STRING 2 | ... | ... |
| | ... | ... | ... |
| 2 | ... | ... | ... |
| ... | ... | ... | ... |

| NODE | KEY | VALUE | |
|---|---|---|---|
| | | SECONDARY INDEX PORTION | DATA PORTION |
| 1 | 1010101011011110010101101001011<u>10101100010100</u> | 01000100010001110100111101110000100100110010000011011 | "test_data1" |
| 2 | ... | ... | ... |
| 3 | ... | ... | ... |
| ... | ... | ... | ... |
| 10 | | ... | ... |

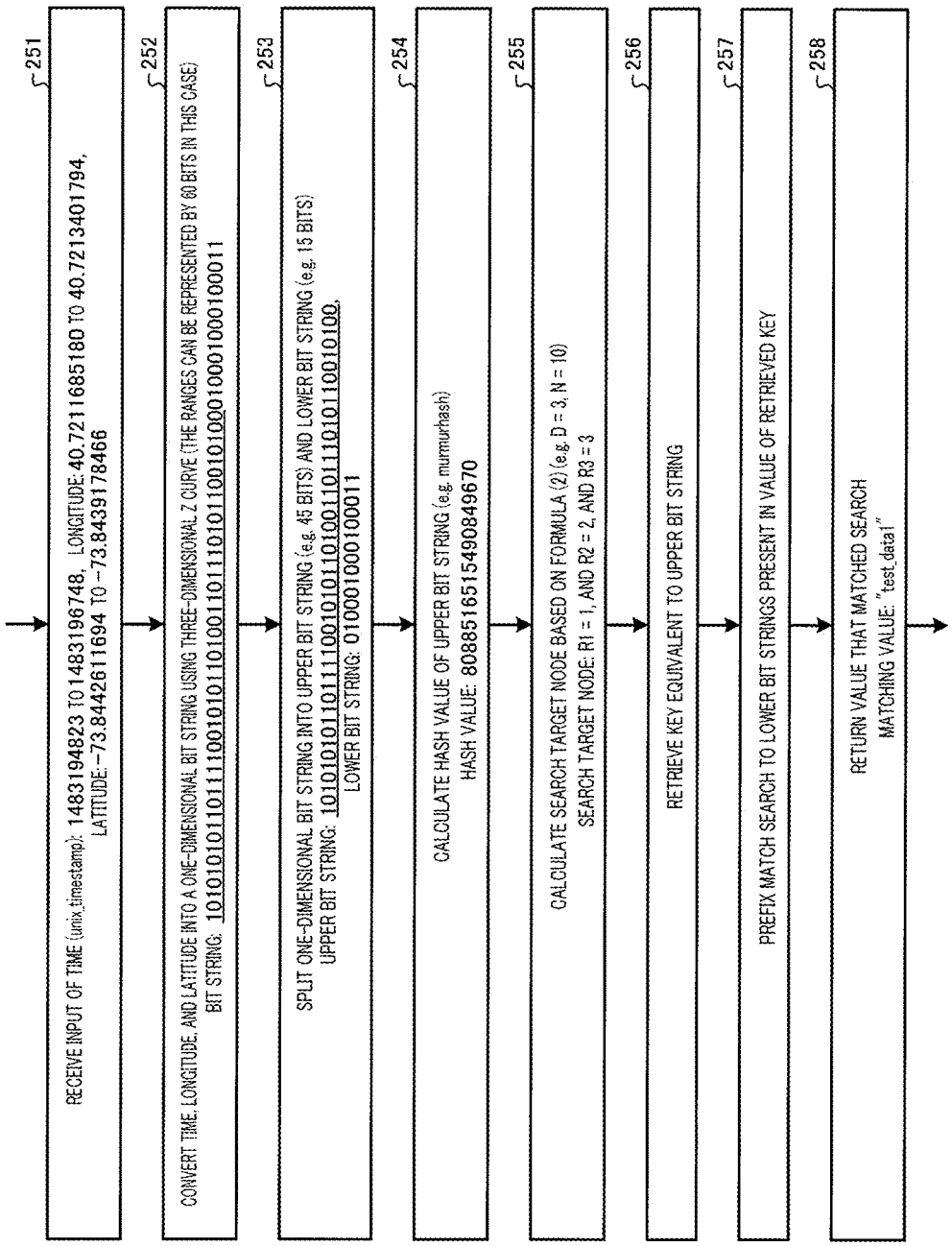

251 RECEIVE INPUT OF TIME (unix_timestamp): 1483194823 TO 1483196748, LONGITUDE: 40.7211685180 TO 40.7213401794, LATITUDE: -73.8442611694 TO -73.8439178466

252 CONVERT TIME, LONGITUDE, AND LATITUDE INTO A ONE-DIMENSIONAL BIT STRING USING THREE-DIMENSIONAL Z CURVE (THE RANGES CAN BE REPRESENTED BY 60 BITS IN THIS CASE) BIT STRING: 101010101101111001010101010011011101011001010001000100011

253 SPLIT ONE-DIMENSIONAL BIT STRING INTO UPPER BIT STRING (e.g. 45 BITS) AND LOWER BIT STRING (e.g. 15 BITS) UPPER BIT STRING: 101010101101111001010101010011011101011001 LOWER BIT STRING: 010001000100011

254 CALCULATE HASH VALUE OF UPPER BIT STRING (e.g. murmurhash) HASH VALUE: 8088516515490849670

255 CALCULATE SEARCH TARGET NODE BASED ON FORMULA (2) (e.g. D = 3, N = 10) SEARCH TARGET NODE: R1 = 1, AND R2 = 2, AND R3 = 3

256 RETRIEVE KEY EQUIVALENT TO UPPER BIT STRING

257 PREFIX MATCH SEARCH TO LOWER BIT STRINGS PRESENT IN VALUE OF RETRIEVED KEY

258 RETURN VALUE THAT MATCHED SEARCH MATCHING VALUE: "test_data1"

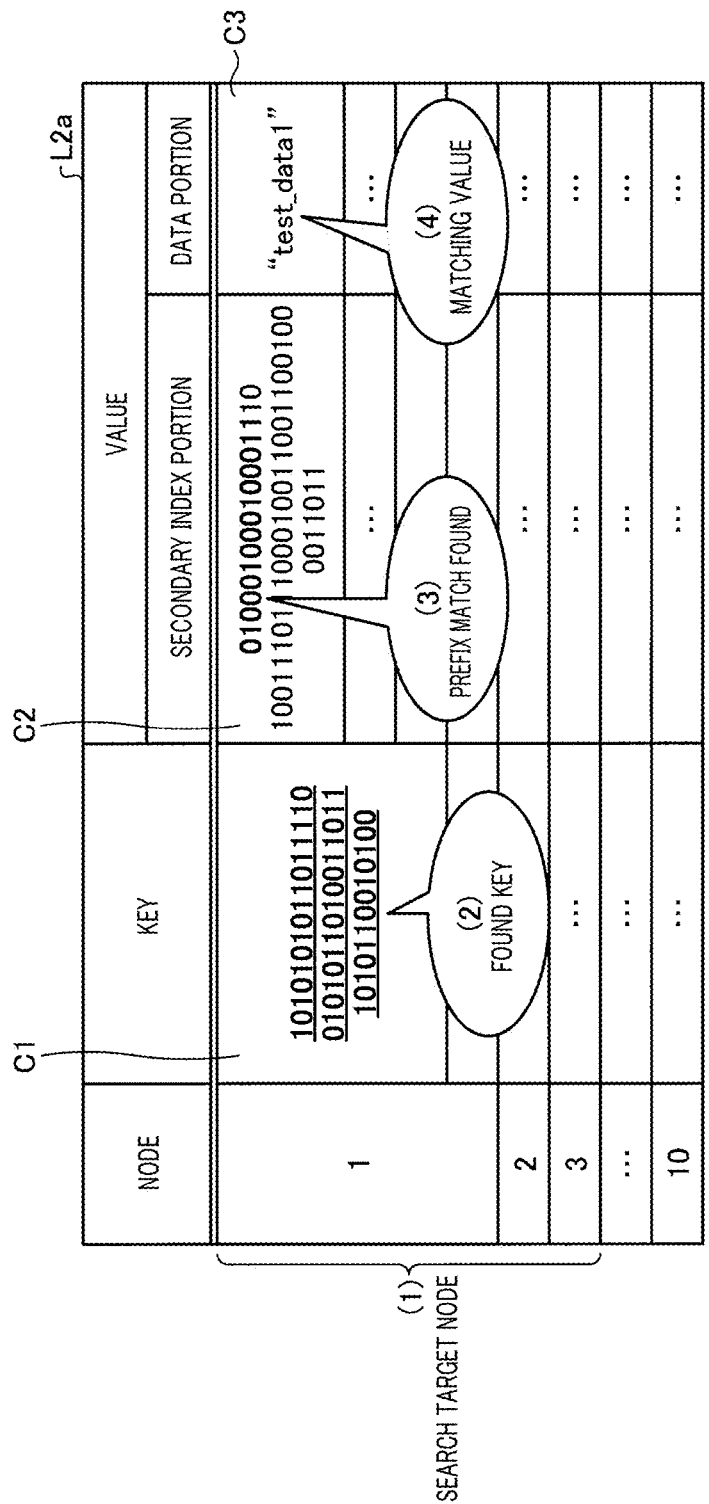

Fig. 18

| $i_m$=table(k) | |
|---|---|
| k | COMBINATION LIST $i_m$ |
| 0 | (···,···,···) |
| 1 | (···,···,···) |
| ··· | (···,···,···) |
| $_nC_d-1$ | (···,···,···) |

Fig. 21

| | k | 1 | 2 | 3 | 4 |
|---|---|---|---|---|---|
| ALL COMBINATIONS | 1 | ◯ | ◯ | | |
| | 2 | ◯ | | | ◯ |
| | 3 | | ◯ | ◯ | |
| | 4 | | | ◯ | ◯ |
| | 5 | ◯ | | ◯ | |
| | 6 | | ◯ | | ◯ |

Fig. 23

| NODE | KEY | VALUE | |
|---|---|---|---|
| | | SECONDARY INDEX PORTION | DATA PORTION |
| 1 | UPPER BIT STRING 1_LABEL NUMBER | LOWER BIT STRING 1 | data1 |
| | | LOWER BIT STRING 2 | data2 |
| | | ... | ... |
| | UPPER BIT STRING 2_LABEL NUMBER | ... | ... |
| | ... | ... | ... |
| 2 | ... | ... | ... |
| ... | ... | ... | ... |

| NODE | KEY | VALUE | |
|---|---|---|---|
| | | SECONDARY INDEX PORTION | DATA PORTION |
| 1 | 10101010110111100101011010100110110<br>10101100101000-0 | 0100001000100011101001110111100010<br>0110011001000011011 | "test_data1" |
| 2 | ... | ... | ... |
| 3 | ... | ... | ... |
| ... | ... | ... | ... |
| 10 | ... | ... | ... |

L22a

INFORMATION MANAGEMENT DEVICE, INFORMATION MANAGEMENT METHOD, AND INFORMATION MANAGEMENT PROGRAM

CROSS-REFERENCE TO RELATED APPLICATIONS

The present application is based on PCT filing PCT/JP2019/005769, filed Feb. 18, 2019, which claims priority to JP 2018-027368, filed Feb. 19, 2018, JP 2018-129528, filed Jul. 6, 2018, and JP 2019-020118, filed Feb. 6, 2019, the entire contents of each are incorporated herein by reference.

TECHNICAL FIELD

The present invention relates to an information management device, an information management method, and an information management program.

BACKGROUND ART

With the advent of the IoT (Internet of Things) era, the data acquired by IoT devices are being used in a variety of ways via networks. When the IoT devices are mobile devices such as vehicles, drones, and smart phones, the amount of handled data is gigantic, since time information and position information (spatio-temporal information) are associated with actual acquired data. Therefore, a database system that allows for appropriate accumulation of a vast amount of data as well as efficient and high-speed data retrieval from the database using spatio-temporal information has been sought after by business operators that handle IoT device data.

In this connection, relational database management systems (RDBMS) have been proposed before, which allow for management of accumulated data in table formats so that universal searches including spatial range searches can be dealt with (see NPL 1).

As another database technique, distributed key-value stores have been proposed, which allow for distributed storage of a large amount of data across a plurality of nodes as well as high-speed search with limited search conditions (see NPL 2). A technique has also been proposed to alleviate the limitations on search conditions in distributed key-value stores, wherein secondary indexes are built by storing a plurality of values in one key (see NPL 3). In another proposed technique that handles spatio-temporal information, spatio-temporal information is converted into a one-dimensional bit string for efficient data storage and search (see NPL 4).

CITATION LIST

Non Patent Literature

[NPL 1] "What is a Relational Database?" [online], [found on Internet on 2 Feb. 2018] <URL: https://aws.amazon.com/jp/relational-database>
[NPL 2] *IoT Ni Tekishita NoSQL•Bunsan Key-Value Sutoa* (NoSQL suited to IoT/Distributed Key-Value Store) [online], [found on Internet on 2 Feb. 2018] <URL: https://thinkit.co.jp/story/2014/09/25/5280?page=0%2C1>
[NPL 3] "redis" [online], [found on Internet on 2 Feb. 2018] <URL: https://redis.io/topics/indexes>
[NPL 4] "ST Code: The Text Encoding Algorithm for Latitude/Longitude/Time", [online], [found on Internet on 2 Feb. 2018] <https://link.springer.com/chapter/10.1007%2F978-3-319-03611-3_10>

SUMMARY OF THE INVENTION

Technical Problem

When accumulating spatio-temporal information in an RDBMS, it is necessary to update indexes each time data is stored or deleted. However, the time required for updating indexes in RDBMS entailed the problem of extensive update time when handling a vast amount of data.

Even with the use of secondary indexes in distributed key-value stores and even though the spatio-temporal information is converted into a one-dimensional bit string, a range search of the spatio-temporal information that is multi-dimensional information was difficult, and efficient high-speed data search using spatio-temporal information was hard to achieve.

Moreover, when a large number of values are stored in one key in the case where secondary indexes are used, the processing load may become ill-balanced among the nodes that form the data stores, and the performance may deteriorate significantly.

The present invention was made in view of the above and it is an object of the invention to provide an information management device, an information management method, and an information management program, which enable appropriate distribution and storage of a large amount of data including spatio-temporal information, as well as efficient and high-speed data search through use of spatio-temporal information.

Means for Solving the Problem

To solve the problems described above and to achieve the object, the information management device according to the present invention is an information management device that manages spatio-temporal information including time information and position information as well as associated data associated with the spatio-temporal information by distributing the spatio-temporal information and associated data across a plurality of nodes that are key-value stores, and includes: a memory; and processing circuitry coupled to the memory and configured to: convert the spatio-temporal information in storage object information into a one-dimensional bit string, split the converted one-dimensional bit string into an upper bit string and a lower bit string, and cause a storage target node to store at least the split upper bit string in a key and to store the split lower bit string and associated data in a value of that key, and convert a range condition of spatio-temporal information of an object to be retrieved into one-dimensional bit string, split the converted one-dimensional bit string into an upper bit string and a lower bit string, retrieve a key from a search target node using at least the split upper bit string, retrieve a value corresponding to the split lower bit string from values of the retrieved key, and output associated data contained in the retrieved value as a search result.

Effects of the Invention

According to the present invention, a large amount of data including spatio-temporal information can be appropriately distributed and stored, and data can be searched efficiently and at high speed using the spatio-temporal information.

BRIEF DESCRIPTION OF DRAWINGS

FIG. 3 is a diagram illustrating one example of a data structure of data stored in a node shown in FIG. 1.

FIG. 8 is a diagram explaining a data retention format in the data memory system shown in FIG. 1.

FIG. 9 is a diagram explaining the flow of processing in the search unit shown in FIG. 1.

FIG. 10 is a diagram explaining a data retention format in the data memory system shown in FIG. 1.

FIG. 18 is a diagram illustrating one example of a data structure of distribution destination node combination information.

FIG. 21 is a diagram showing combinations of nodes that can be selected by the spatio-temporal information management device shown in FIG. 17.

FIG. 23 is a diagram illustrating one example of a data structure of data stored in the data memory system shown in FIG. 22.

FIG. 26 is a diagram explaining a data retention format in the data memory system shown in FIG. 22.

DESCRIPTION OF EMBODIMENTS

Figure 1:
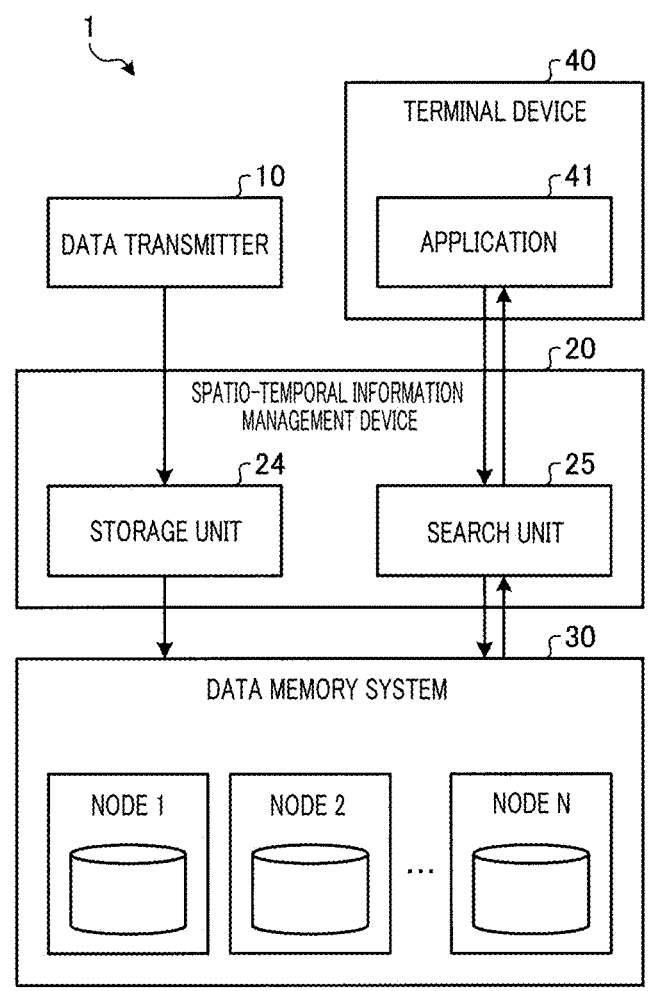
FIG. 1 is a diagram illustrating one example of a configuration of an information management system in Embodiment 1.

Hereinafter, one embodiment of the present invention will be described in detail with reference to the drawings. Note, this embodiment shall not limit the present invention. Same parts in the illustrations of the drawings are given the same reference numerals.

Embodiment 1

Embodiment 1 of the present invention will be described. FIG. 1 is a diagram illustrating one example of a configuration of the information management system in Embodiment 1.

As shown in FIG. 1, the information management system 1 according to Embodiment 1 includes a data transmitter 10, a spatio-temporal information management device 20 (information management device), a data memory system 30, and a terminal device 40. The spatio-temporal information management device 20 is connected to the data transmitter 10, data memory system 30, and terminal device 40 via a network or the like.

The data transmitter 10 is an IoT device. The data transmitter 10 is a mobile device such as, for example, a vehicle, drone, smart phone, and the like. The data transmitter 10 transmits data it acquired while moving to the spatio-temporal information management device 20. The data transmitter 10 transmits acquired data, wherein spatio-temporal information including time information and position information is correlated to associated data associated with the spatio-temporal information, to the spatio-temporal information management device 20. There may be one data transmitter 10, or a plurality of data transmitters.

Figure 2:
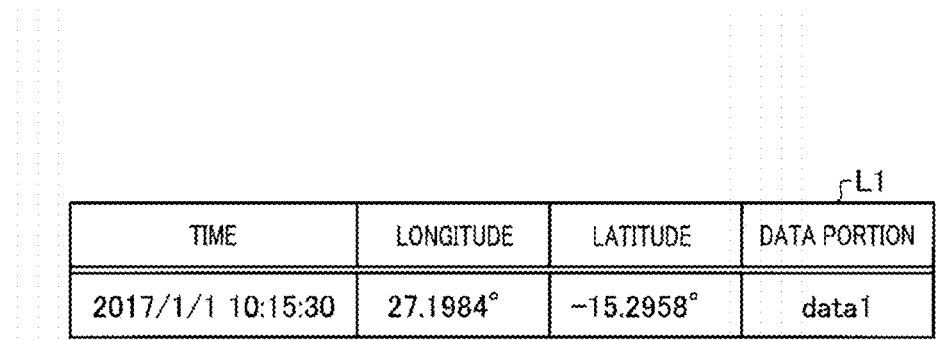
FIG. 2 is a diagram illustrating one example of a data structure of acquired data transmitted by the data transmitter shown in FIG. 1.

FIG. 2 is a diagram illustrating one example of a data structure of acquired data transmitted by the data transmitter 10 shown in FIG. 1. As shown in the list L1 of FIG. 2, the data acquired by the data transmitter 10 has a configuration wherein various data (data portion) acquired by the data transmitter 10 is associated with the time information indicating the time at which data was acquired and the position information indicative of a longitude and latitude. For example, the data transmitter 10 transmits "data1" acquired at time "2017/1/110:15:30" at location "27.1984°" (longitude) and "−15.2958°" (latitude) to the spatio-temporal information management device 20, associating the data with the time information and position information.

Referring back to FIG. 1, the spatio-temporal information management device 20 will be briefly described. The spatio-temporal information management device 20 manages the acquired data transmitted from the data transmitter 10 by distributing and storing the data across a plurality of nodes 1 to N that are key-value stores. The spatio-temporal information management device 20 retrieves associated data associated with a range condition of spatio-temporal information of an object to be retrieved from the data stored in the nodes 1 to N, and outputs the data as a search result. The spatio-temporal information management device 20 includes a storage unit 24 and a search unit 25 as essential parts. In an alternative configuration, the spatio-temporal information management device 20 may be incorporated in the data transmitter 10 or an application 41.

The acquired data is distributed and stored across the nodes 1 to N in the storage unit 24. The storage unit 24 converts the spatio-temporal information in the storage object information into one-dimensional bit string, and splits the converted one-dimensional bit string into an upper bit string and a lower bit string. The storage unit 24 then causes a storage target node to store the split upper bit string in a key and to store the split lower bit string and associated data in a value of that key. As will be described later, even when there is a disproportionate amount of data at a specific time in a specific area, the storage targets can be dispersed since the storage unit 24 sets different nodes as storage targets for each of the data.

The search unit 25 outputs associated data associated with a range condition of spatio-temporal information of an object to be retrieved as a search result. The search unit 25 converts the range condition of spatio-temporal information of the object to be retrieved into one-dimensional bit string, and splits the converted one-dimensional bit string into an upper bit string and a lower bit string. Using the split upper bit string, the search unit 25 retrieves a key from a search target node, retrieves a value corresponding to the split lower bit string from values of the retrieved key, and outputs the associated data contained in the retrieved value as a search result. As will be described later, the search unit 25 performs the search to a limited number of search target nodes, so that the search is not concentrated on one node and the search load is reduced, and also, since the search is not performed to all the nodes, the search processing can be carried out at higher speed.

The data memory system 30 has a plurality of nodes 1 to N that are key-value stores. The nodes 1 to N are servers, for example, that have storages and execute data input/output to and from the storages, these servers being linked to each other to perform operations related to data input/output.

FIG. 3 is a diagram illustrating one example of a data structure of data stored in nodes 1 to N shown in FIG. 1. As shown in the list L2 of FIG. 3, it is assumed here that the data stored in the nodes 1 to N has a data structure known as a key-value type having secondary index portions.

More specifically, the nodes 1 to N store data in a structure with contents including node ID information, keys, and values, as shown in the list L2. As shown in the list L2, the value includes the secondary index portion, and the data portion where associated data is stored. As will be described later, the upper bit strings of the bit string converted from the spatio-temporal information are stored in the key. The lower bit strings of the bit string converted from the spatio-temporal information are stored in the secondary index of the value.

More specifically, as the list L2 indicates, for example, node N1 stores "lower bit string 1" and "data1" in the secondary index portion and the data portion, respectively, of the value of the key where "upper bit string 1" is stored.

Referring back to FIG. 1, the terminal device 40 will be described. The terminal device 40 is a smart phone or the like owned by a user, and includes the application 41. The application 41 has the function of requesting a search for route guidance or obstruction notification to the spatio-temporal information management device 20. For example, the terminal device 40 transmits a search request to the spatio-temporal information management device 20, with a range condition of the spatio-temporal information of an object to be retrieved as a search condition.

Figure 4:
FIG. 4 is a diagram illustrating one example of a data structure of a search request transmitted by the terminal device shown in FIG. 1.

FIG. 4 is a diagram illustrating one example of a data structure of a search request transmitted by the terminal device 40 shown in FIG. 1. As shown in the list L3 of FIG. 4, the search request data has a data structure wherein data strings indicating the start and end of the spatio-temporal information of the object to be retrieved are associated with each other. The list L3 shows a time, longitude, and latitude for each of the start and end that indicate the range of the spatio-temporal information of the object to be retrieved. In the example of the list L3, the terminal device 40 requests a search for a time range of from "2017/1/109:00:00" to "2017/1/109:15:00", a longitude range of from "27°" to "28°", and a latitude range of from "−16°" to "−15°", as the range conditions of the spatio-temporal information of the object to be retrieved.

Figure 5:
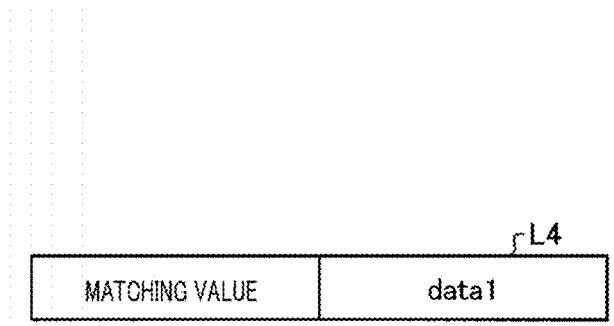
FIG. 5 is a diagram illustrating one example of a data structure of a search result output by the spatio-temporal information management device shown in FIG. 1.

FIG. 5 is a diagram illustrating one example of a data structure of a search result output by the spatio-temporal information management device 20 shown in FIG. 1. The spatio-temporal information management device 20 searches the data in the nodes 1 to N based on the search condition shown in FIG. 3. The spatio-temporal information management device 20 then returns the list L4 shown in FIG. 5, for example, as a search result to the terminal device 40. As shown in the list L4, the spatio-temporal information management device 20 returns "data1" as a matching value that matches the search condition.

[Configuration of Spatio-Temporal Information Management Device]

Figure 6:
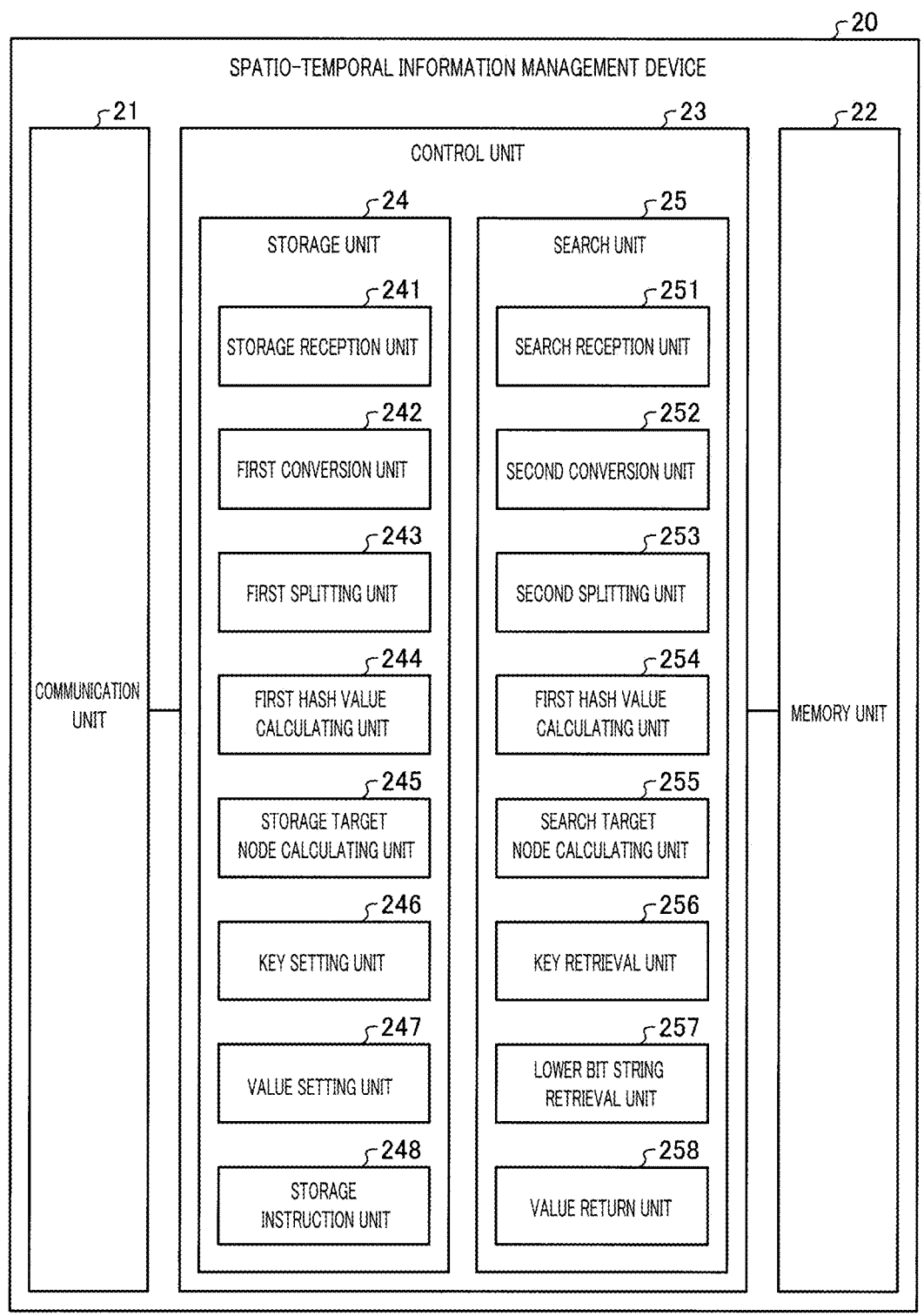
FIG. 6 is a diagram illustrating one example of a configuration of the spatio-temporal information management device shown in FIG. 1.

Next, the configuration of the spatio-temporal information management device 20 will be described. FIG. 6 is a diagram illustrating one example of a configuration of the spatio-temporal information management device 20 shown in FIG. 1. As shown in FIG. 6, the spatio-temporal information management device 20 includes a communication unit 21, a memory unit 22, and a control unit 23. The spatio-temporal information management device 20 may be a physical server, or a virtual server deployed on a physical server.

The communication unit 21 is a communication interface for transmitting and receiving various pieces of information to and from other devices connected thereto via a network 2 or the like. The communication unit 21 is implemented by an NIC (Network Interface Card) or the like and allows for communications between other devices and the control unit 23 (to be described later) via an electrical communication line such as LAN (Local Area Network) or Internet.

The memory unit 22 is a memory device such as an HDD (Hard Disk Drive), an SSD (Solid State Drive), an optical disc, and so on. The memory unit 22 may also be a semiconductor memory that allows data to be rewritten, such as a RAM (Random Access Memory), a flash memory, a NVSRAM (Non Volatile Static Random Access Memory), and so on. The memory unit 22 stores the OS (Operating System) executed on the spatio-temporal information management device 20 and various programs. Moreover, the memory unit 22 stores various pieces of information used in the execution of the programs.

The control unit 23 controls the entire spatio-temporal information management device 20. The control unit 23 is an electronic circuit such as a CPU (Central Processing Unit), an MPU (Micro Processing Unit), and so on, or an integrated circuit such as an ASIC (Application Specific Integrated Circuit), an FPGA (Field Programmable Gate Array), and so on. The control unit 23 has an internal memory for storing programs that define various processing steps, and control data, and executes various processes using the internal memory. The control unit 23 functions as various processing units as various programs operate. The control unit 23 includes the storage unit 24 and the search unit 25.

[Configuration of Storage Unit]

The storage unit 24 includes a storage reception unit 241, a first conversion unit 242, a first splitting unit 243, a first hash value calculating unit 244, a storage target node calculating unit 245 (storage target node selection unit), a key setting unit 246, a value setting unit 247, and a storage instruction unit 248.

The storage reception unit 241 receives an input of acquired data transmitted from the data transmitter 10 as storage object data. The acquired data contains, as mentioned above, spatio-temporal information including time information and position information correlated to associated data associated with the spatio-temporal information. More specifically, the acquired data includes time, longitude, latitude, and data portion.

The first conversion unit 242 converts the spatio-temporal information in the acquired data, input of which has been received, into a one-dimensional bit string. Namely, the first conversion unit 242 converts the time, longitude, and latitude into a one-dimensional bit string.

The first splitting unit 243 splits the one-dimensional bit string converted by the first conversion unit 242 into an upper bit string and a lower bit string. The first hash value calculating unit 244 calculates the hash value of the upper bit string converted by the first conversion unit 242.

The storage target node calculating unit 245 selects a storage target node based on the hash value calculated by the first hash value calculating unit 244. More specifically, the storage target node calculating unit 245 calculates a node number of the storage target using Formula (1), and selects the node bearing the number obtained as the calculation result as the storage target node. Formula (1), where the number of nodes as distribution destinations is given, produces the number of one node as a solution.

[Formula 1]

$$W = (H(\text{Key}) + (\text{rand}(\ )\%D))\%N \quad (1)$$

W: Storage target node number
H(Key): Hash value of key
rand( ): Random 32-bit integer
D: Number of distribution destination nodes
N: Total number of nodes The key setting unit 246 configures a setting for storing the upper bit string split by the first splitting unit 243 in the key in the storage target node. The value setting unit 247 configures a setting for storing the lower bit string split by the first splitting unit 243 and associated data in the value of the key set by the key setting unit 246 among the keys in the storage target node. The storage instruction unit 248 causes the storage target node to store the data in accordance with the settings by the key setting unit 246 and value setting unit 247.

The storage unit 24 uses Formula (1) in this way so as to select different nodes as storage targets for different keys. Therefore, even though the data comes from the same time and same area, the storage unit 24 stores the data in a plurality of separate nodes, and as the storage targets are dispersed this way, the storage loads on the nodes can be reduced. The storage unit 24 converts the spatio-temporal information using one-dimensional bit string conversion, and uses the upper bit string of the one-dimensional bit string converted from the spatio-temporal information as the key. As the storage unit 24 uses one-dimensional bit string conversion that is relatively simple conversion processing to create a key, the time for key creation can be shortened.

[Configuration of Search Unit]

Next, the search unit 25 will be described. The search unit 25 includes a search reception unit 251, a second conversion unit 252, a second splitting unit 253, a second hash value calculating unit 254, a search target node calculating unit 255 (search target node acquisition unit), a key retrieval unit 256, a lower bit string retrieval unit 257, and a value return unit (output unit) 258.

The search reception unit 251 receives an input of a search condition transmitted from the terminal device 40. The search condition is a range condition of the spatio-temporal information of the object to be retrieved to be used for route guidance or obstruction notification. More specifically, the search information is information that indicates the start and end of the time, longitude, and latitude, as shown in the list L3 of FIG. 4.

The second conversion unit 252 converts the range condition of the spatio-temporal information of the object to be retrieved for which a search request has been received into a one-dimensional bit string. The second splitting unit 253 splits the one-dimensional bit string converted by the second conversion unit 252 into an upper bit string and a lower bit string. The second hash value calculating unit 254 calculates the hash value of the upper bit string split by the second splitting unit 253.

The search target node calculating unit 255 determines a search target node based on the hash value calculated by the second hash value calculating unit 254. More specifically, the search target node calculating unit 255 calculates a node number of the search target using Formula (2), and determines the node bearing the number obtained as the calculation result as the node to be searched. Formula (2) produces solutions for the number D of distribution destination nodes set by Formula (1), if D set in Formula (1) is 2 or more.

[Formula 2]

$$R_d = (H/(\text{Key}) + (d-1))\%N \quad (2)$$

R: Search target node number
H(Key): Hash value of key $d: 1, 2, \ldots, D$

N: Total number of nodes

The key retrieval unit 256 retrieves a key that matches the upper bit string split by the second splitting unit 253 from the search target node. The lower bit string retrieval unit 257 retrieves a value having a prefix match with the lower bit string split by the second splitting unit from the values of the key retrieved by the key retrieval unit 256.

The value return unit 258 outputs the associated data contained in the value retrieved by the lower bit string retrieval unit 257 as a search result. In other words, the value return unit 258 returns the associated data contained in the value retrieved by the lower bit string retrieval unit 257 to the terminal device 40.

The search unit 25 executes the search processing to a limited number of search target nodes by using Formula (2). Accordingly, in Embodiment 1, the search processing can be carried out at higher speed, since the search is not concentrated on one node and the search load is reduced, and since the search is not performed to all the nodes.

[Processing Flow of Storage Unit]

Figure 7:
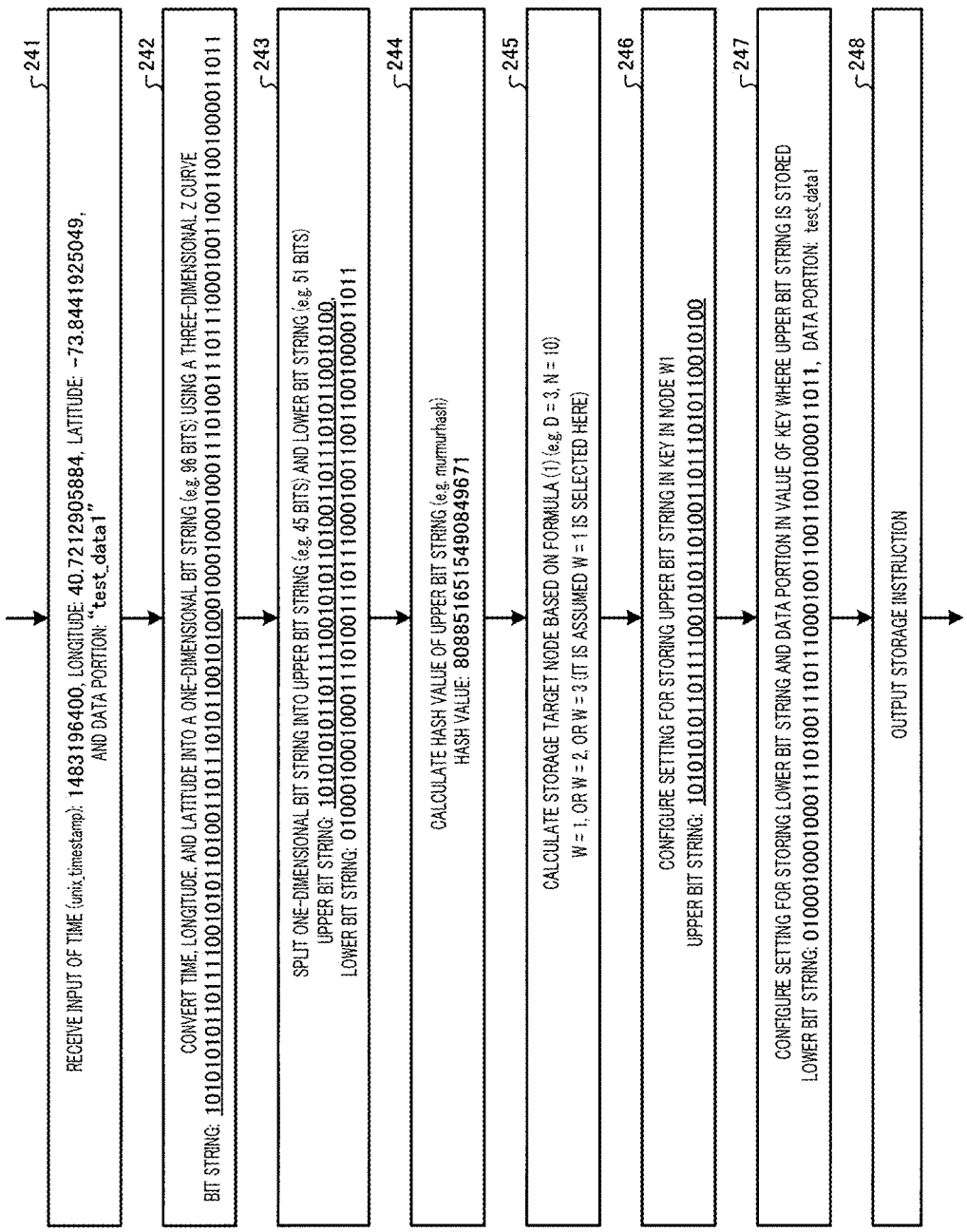
FIG. 7 is a diagram explaining the flow of processing in the storage unit shown in FIG. 1.

Next, the flow of the processing in the storage unit 24 will be described in more specific terms with reference to FIG. 7. FIG. 7 is a diagram explaining the flow of the processing in the storage unit 24 shown in FIG. 1.

One case will be described here, where, as shown in FIG. 7, the storage reception unit 241 has received an input of data "time (unix_timestamp): 1483196400, longitude: 40.7212905884, latitude: −73.8441925049, data portion: "test_data1"", for example.

In this case, the first conversion unit 242 converts the time "1483196400", longitude "40.7212905884", and latitude "−73.8441925049" into a one-dimensional bit string (e.g. 96 bits), using a three-dimensional Z curve. The obtained one-dimensional bit string is "101010101101111001010110100110111010110010100-0100010001000111 01000111011100010011001100100001011".

Next, the first splitting unit 243 splits the one-dimensional bit string into an upper bit string (e.g. 45 bits) and a lower bit string (e.g. 51 bits). More specifically, the first splitting unit 243 splits "101010101101111001-0101101001101110101100101000100010001000111 01000111011100010011001100100001011" into a 45-bit string "101010101101111001010110100110111010110010100" and a 51-bit string "010001000100011101-001110111000100110011001000011011" as the upper bit string and the lower bit string, respectively.

The first hash value calculating unit 244 calculates the hash value of the upper bit string "101010101101111001010110100110111010110010100". The first hash value calculating unit 244 uses murmurhash as the hash function, for example, and calculates the hash value "8088516515490849671" of the upper bit string "101010101101111001010110100110111010110010100".

The storage target node calculating unit 245 applies the hash value "8088516515490849671" calculated by the first hash value calculating unit 244 to Formula (1) to obtain the number of the storage target node. Here, it is assumed that D=3 and N=10, for example, and W=1 was selected from W=1, W=2, or W=3.

The key setting unit 246 configures a setting for storing the upper bit string "101010101101111001010110100110111010110010100" in a key in the node W1. The value setting unit 247 configures a setting for storing the lower bit string "010001000100011101001110111000100110011001000-00011011" and "test_data1" as a secondary index portion and a data portion, respectively, of the value of the key "101010101101111001010110100110111010110010100" in the storage target node W1. The storage instruction unit 248 thus causes the storage target node to store the data in accordance with the settings by the key setting unit 246 and value setting unit 247.

FIG. 8 is a diagram explaining a data retention format in the data memory system 30 shown in FIG. 1. As shown in the list L2a of FIG. 8, "101010101101111001010110100110111010110010100" is stored in the key in the node "1" in accordance with the settings by the storage unit 24 shown in FIG. 7. As shown in the list L2a, "010001000-1000111010011101110001001100110010000110011" and "test_data1" are stored as a secondary index portion and a data portion, respectively, of the value of this key "101010101101111001010110100110111010110010100".

[Processing Flow of Search Unit]

Next, the flow of the processing in the search unit 25 will be described in more specific terms with reference to FIG. 9. FIG. 9 is a diagram explaining the flow of the processing in the search unit 25 shown in FIG. 1. FIG. 10 is a diagram explaining a data retention format in the data memory system 30 shown in FIG. 1.

One case will be described here, where, as shown in FIG. 9, the search reception unit 251 has received an input of a search condition "time (unix_timestamp): 1483194823 to 1483196748, longitude: 40.7211685180 to 40.7213401794, latitude: −73.8442611694 to −73.8439178466", for example.

In this case, the second conversion unit 252 converts the input ranges of time "1483194823 to 1483196748", longitude "40.7211685180 to 40.7213401794", and latitude "−73.8442611694 to −73.8439178466" into a one-dimensional bit string, using a three-dimensional Z curve. In this example, the ranges can be represented by 60 bits, and the second conversion unit 252 can obtain a bit string "101010101101111001010110100110111010110010100-010001000100011".

Next, the second splitting unit 253 splits the one-dimensional bit string into an upper bit string (e.g. 45 bits) and a lower bit string (e.g. 51 bits). More specifically, the second splitting unit 253 splits "101010101-10111100101011010011011101011001010001000100001-00011" into a 45-bit string "101010101101111001010110100110111010110010100" and a 15-bit string "010001000100011" as the upper bit string and the lower bit string, respectively.

The second hash value calculating unit 254 calculates the hash value of the upper bit string "101010101101111001010110100110111010110010100". The second hash value calculating unit 254 uses murmurhash as the hash function, for example, and calculates the hash value "8088516515490849670" of the upper bit string "101010101101111001010110100110111010110010100".

The search target node calculating unit 255 applies the hash value "8088516515490849670" calculated by the second hash value calculating unit 254 to Formula (2) to obtain the numbers of the search target nodes. When D=3 and N=10, for example, from Formula (2), the search target node can be determined as $R_1=1$, $R_2=2$, and $R_3=3$. Thus the nodes "1", "2", and "3" in the list L2a of FIG. 10 are determined as search target nodes (see (1) in FIG. 10).

The key retrieval unit 256 searches the search target nodes for a key that matches the upper bit string "101010101101111001010110100110111010110010100". As a result, as shown in the list L2a, the key in the field C1 of the node "1" is retrieved as the found key (see (2) in FIG. 10).

Next, the lower bit string retrieval unit 257 searches the values of the key retrieved by the key retrieval unit 256 for a secondary index portion having a prefix match with the lower bit string "010001000100011". As a result, the field C2 having a prefix match with the lower bit string "010001000100011" is retrieved as the found value (see (3) in FIG. 10) from the values corresponding to the key in the field C1 of the node "1".

The value return unit 258 returns the data "test_data1" (see field C3 in FIG. 10) in the data portion corresponding to the secondary index portion in the field C2 retrieved by the lower bit string retrieval unit 257 as the value matching the search to the terminal device 40 (see (4) in FIG. 10).

[Processing Steps of Storage Processing]

Figure 11:
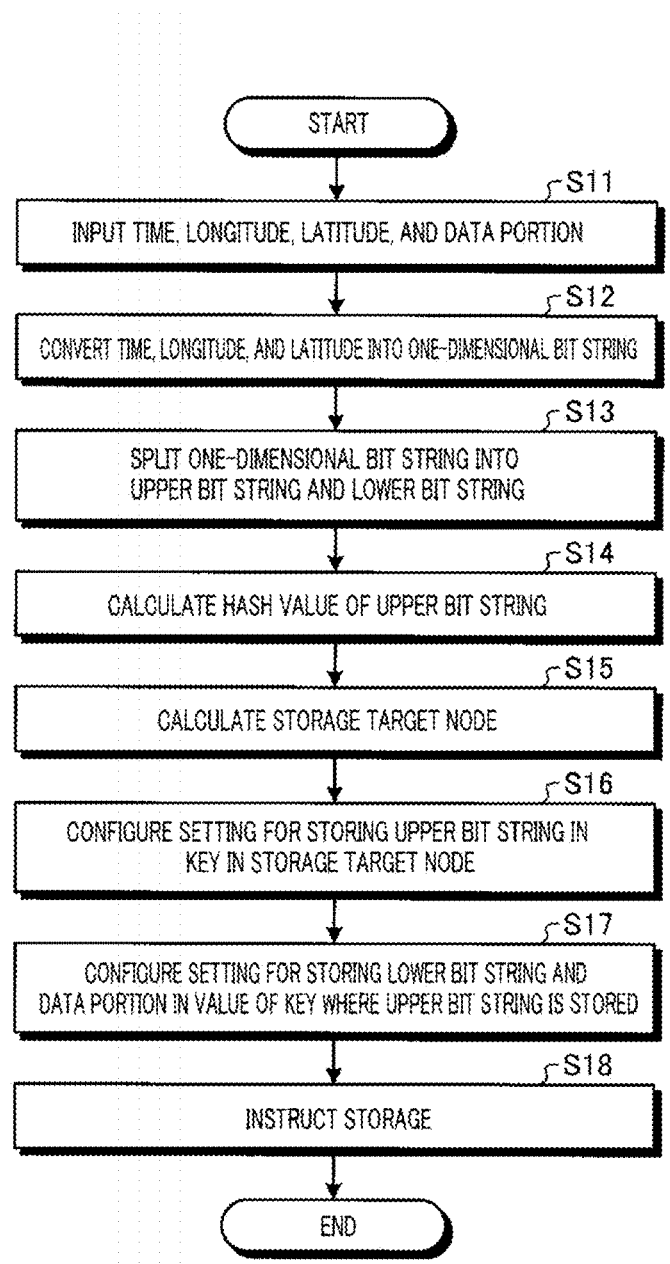
FIG. 11 is a flowchart showing the processing steps of the information storage processing performed by the spatio-temporal information management device shown in FIG. 6.

Next, the processing steps of the information storage processing performed by the spatio-temporal information management device 20 will be described. FIG. 11 is a flowchart showing the processing steps of the information storage processing performed by the spatio-temporal information management device 20 shown in FIG. 6.

As shown in FIG. 11, when the storage reception unit 241 receives an input of acquired data transmitted from the data transmitter 10 (step S11), the first conversion unit 242 converts spatio-temporal information, which is time, longitude, and latitude, of the acquired data, the input of which has been received, into a one-dimensional bit string (step S12).

Next, the first splitting unit 243 splits the one-dimensional bit string converted by the first conversion unit 242 into an upper bit string and a lower bit string (step S13). The first hash value calculating unit 244 calculates the hash value of the upper bit string converted by the first conversion unit 242 (step S14).

The storage target node calculating unit 245 calculates a storage target node based on the hash value calculated by the first hash value calculating unit 244 (step S15). More specifically, the storage target node calculating unit 245 calculates the node number of the storage target using Formula (1), and selects the node bearing the number obtained as the calculation result as the storage target node.

The key setting unit 246 configures a setting for storing the upper bit string split by the first splitting unit 243 in the key in the storage target node (step S16). The value setting unit 247 configures a setting for storing the lower bit string split by the first splitting unit 243 and associated data in the value of the key set by the key setting unit 246 among the keys in the storage target node (step S17). The storage instruction unit 248 gives the storage target node instructions to store the data in accordance with the settings by the key setting unit 246 and value setting unit 247 (step S18), and ends the storage processing.

[Processing Steps of Search Processing]

Figure 12:
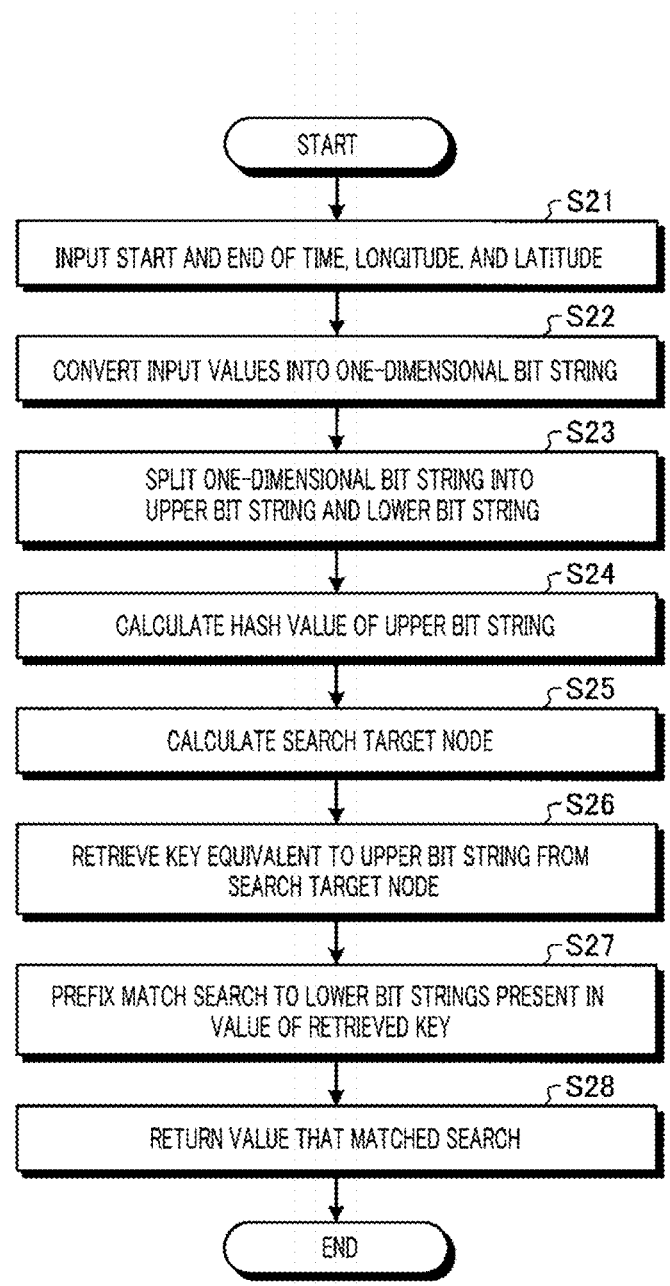
FIG. 12 is a flowchart showing the processing steps of the information search processing performed by the spatio-temporal information management device shown in FIG. 6.

Next, the processing steps of the information search processing performed by the spatio-temporal information management device 20 will be described. FIG. 12 is a flowchart showing the processing steps of the information search processing performed by the spatio-temporal information management device 20 shown in FIG. 6.

As shown in FIG. 12, first, the search reception unit 251 receives an input of information indicating start and end of the time, longitude, and latitude transmitted from the terminal device 40 as a search condition (step S21). The second conversion unit 252 then converts the input values into a one-dimensional bit string (step S22).

Next, the second splitting unit 253 splits the one-dimensional bit string converted by the second conversion unit 252 into an upper bit string and a lower bit string (step S23). The second hash value calculating unit 254 calculates the hash value of the upper bit string split by the second splitting unit 253 (step S24).

The search target node calculating unit 255 calculates a search target node based on the hash value calculated by the second hash value calculating unit 254 (step S25). More specifically, the search target node calculating unit 255 calculates node numbers of the search targets using Formula (2), and determines the nodes bearing the numbers obtained as the calculation result as the nodes to be searched.

The key retrieval unit 256 retrieves a key that matches (is equivalent to) the upper bit string split by the second splitting unit 253 from the search target nodes (step S26). The lower bit string retrieval unit 257 retrieves a value having a prefix match with the lower bit string split by the second splitting unit from the lower bit strings present in the values of the key retrieved by the key retrieval unit 256 (step S27).

The value return unit 258 returns the associated data contained in the value retrieved by the lower bit string retrieval unit 257 to the terminal device 40 as the value matching the search (step S28), and ends the search processing.

Effects of Embodiment 1

As described above, the spatio-temporal information management device 20 according to Embodiment 1 converts the spatio-temporal information in the storage object information into a one-dimensional bit string, splits the converted one-dimensional bit string into an upper bit string and a lower bit string, and causes a storage target node to store the split upper bit string in a key and to store the split lower bit string and associated data in a value of that key. The spatio-temporal information management device 20 acquires the storage target node number by calculating the hash value of the upper bit string and applying the obtained hash value to Formula (1). Formula (1) produces one node number.

In Embodiment 1, the number of distribution destination nodes D is set by Formula (1). Therefore, when several datasets have the same key "A", the datasets are stored in separate nodes in the number of D. In Embodiment 1, if a dataset has key "B", Formula (1) produces a different hash value for the key, so that the dataset is stored in one of the plurality of nodes different from the node where the data of key "A" is stored.

The spatio-temporal information management device 20 thus computes different nodes as storage target nodes for various datasets even when there is a disproportionate amount of data at a specific time in a specific area. Accordingly, when storing datasets of the same time and same area, the spatio-temporal information management device 20 can distribute and store each dataset across a plurality of nodes so that imbalance in the load among the nodes can be alleviated. As a result, a large amount of data containing spatio-temporal information can be appropriately distributed and stored by the spatio-temporal information management device 20.

Figure 13:
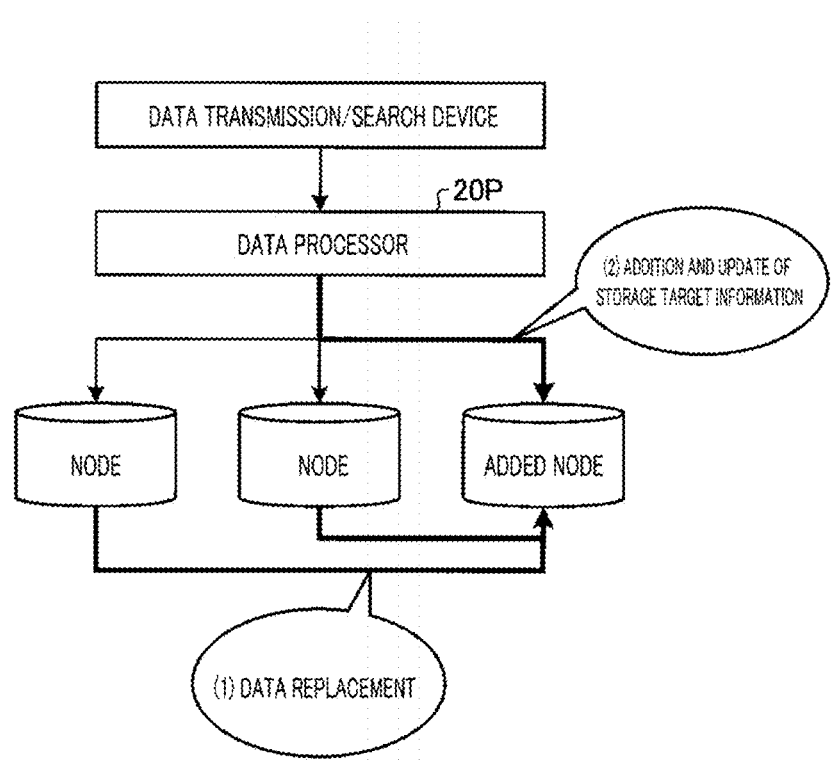
FIG. 13 is a diagram explaining data distribution in an existing database system.
Figure 14:
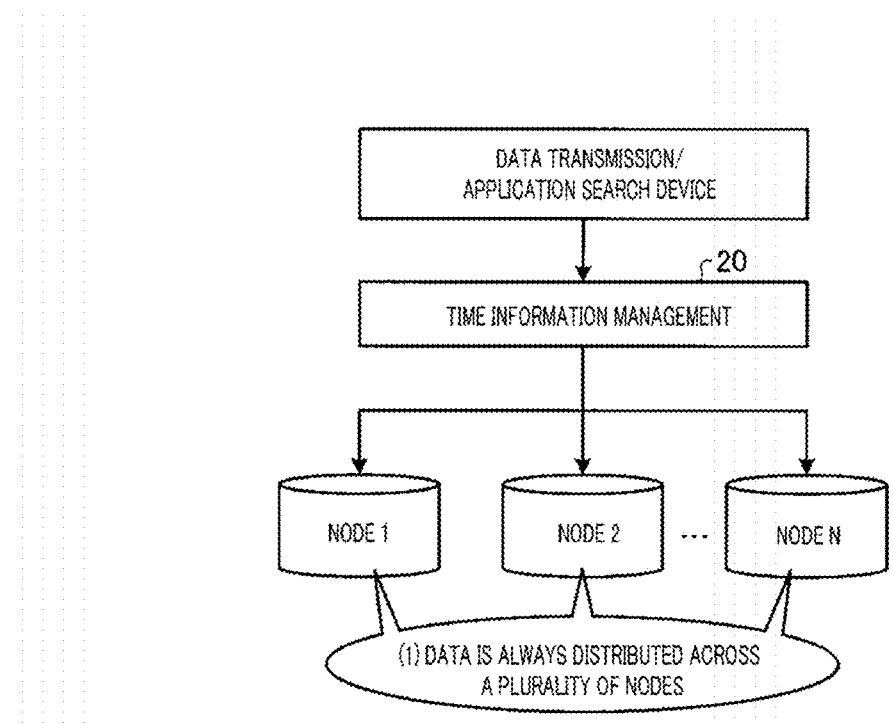
FIG. 14 is a diagram explaining data distribution performed by the spatio-temporal information management device according to Embodiment 1.
Figure 15:
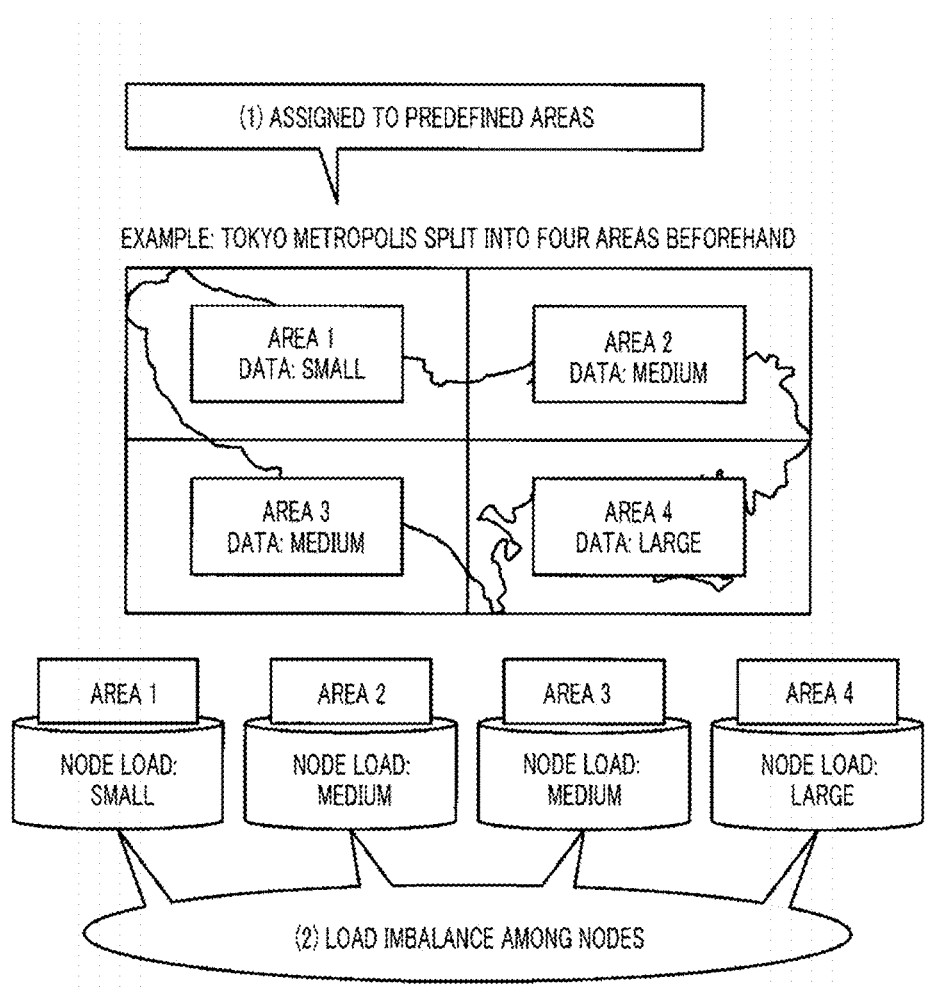
FIG. 15 is a diagram explaining data distribution in an existing database system.
Figure 16:
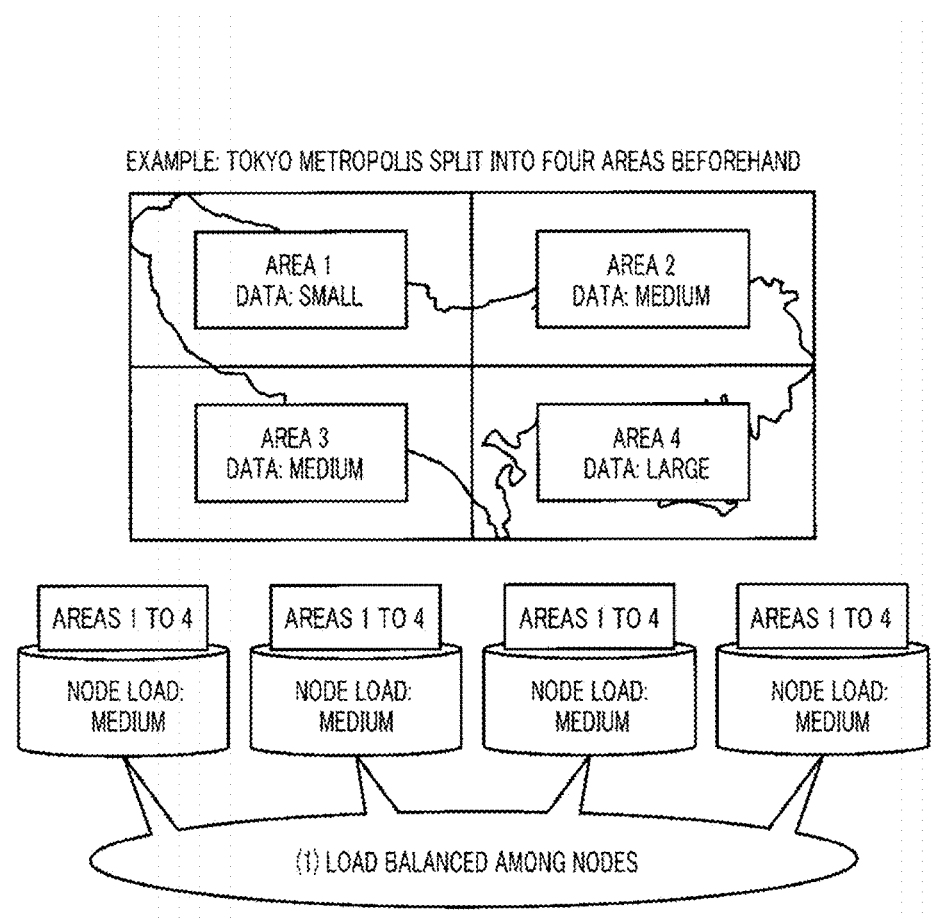
FIG. 16 is a diagram explaining data distribution performed by the spatio-temporal information management device according to Embodiment 1.

FIG. 13 and FIG. 15 are diagrams explaining data distribution in an existing database system. FIG. 14 and FIG. 16 are diagrams explaining data distribution performed by the spatio-temporal information management device 20 according to Embodiment 1.

As shown in FIG. 13, the existing data processor 20P splits spatio-temporal data among predefined areas and determines data placement. Previously, therefore, the data density differed among various areas, and the load was concentrated on a specific node. To disperse the load on the specific node, previously, the data had to be replaced as nodes were added (see (1) in FIG. 13), which required addition and update of storage target information.

The existing method wherein data were assigned to pre-defined areas as shown in FIG. 15 entailed the problem of uneven load among the nodes (see (1), (2) in FIG. 15). For example, if Tokyo Metropolis is divided into four areas beforehand and the areas 1 to 4 are each assigned to four nodes, area 1 will have less data and lower load, while area 4 will have more data and high load. In the existing method, the data density differed among various areas in this way, and the load was concentrated on a specific node.

The number of mobile IoT devices that are present, in particular, varies largely depending on the time zones (rush hours vs night time) or regions (city vs suburb). In the existing method, when secondary indexes are used with keys retaining time information and position information, the number of values retained in one key varied largely, as a result of which there was an imbalance in load among the nodes that configured distributed key-value stores. Namely, load was concentrated on a specific node in the existing method.

In contrast, the spatio-temporal information management device 20 always distributes data across a plurality of nodes as shown in FIG. 14, so that the amounts of data in respective nodes are evenly distributed and the performance can be maintained. According to Embodiment 1, as shown in FIG. 16, data is distributed and stored in a plurality of nodes, and when retrieving data, a plurality of nodes are searched, so that the load is balanced among the nodes. In other words, the data can be distributed without being affected by data imbalance in accordance with time zones or areas. Therefore, the spatio-temporal information management device 20 can efficiently store spatio-temporal information that is multi-dimensional information in data stores.

The spatio-temporal information management device 20 converts a range condition of spatio-temporal information of an object to be retrieved into one-dimensional bit string, splits the converted one-dimensional bit string into an upper bit string and a lower bit string, retrieves a key from a search target node using the split upper bit string, retrieves a value corresponding to the split lower bit string from values of the retrieved key, and outputs associated data contained in the retrieved value as a search result.

Here, the spatio-temporal information management device 20 does not search all the nodes for a key, but only a limited number (D) of nodes, D being calculated using Formula (2). After that, the secondary index portions of the retrieved key are searched for a prefix match to find the stored data. This means that the spatio-temporal information management device 20 does not search one node intensively. Since the spatio-temporal information management device 20 searches a limited number of nodes for a key, the search processing can be executed efficiently and at high speed while the load of the search processing is reduced, as compared to when all the nodes are searched for a key.

The existing RDBMS requires creation and update of indexes when spatio-temporal information is stored every time a large amount of data is stored, because of which a certain amount of time is required for the index creation processing. In contrast, when storing spatio-temporal information, the spatio-temporal information management device 20 converts the spatio-temporal information using one-dimensional bit string conversion, and uses the upper bit string of the one-dimensional bit string as the key. Since one-dimensional bit string conversion is relatively simple processing, the spatio-temporal information management device 20 can reduce the time for the index creation pro-cessing as compared to before. Accordingly, the spatio-temporal information management device 20 allows for high-speed and efficient storage of spatio-temporal information that is multi-dimensional information as compared to existing storage methods.

As described above, processing loads can be distributed across nodes that form data stores through storage and retrieval of spatio-temporal information using the spatio-temporal information management device 20 according to Embodiment 1. With the spatio-temporal information management device 20, business operators handling data of mobile IoT devices can store a vast amount of data at high speed. Moreover, since the spatio-temporal information management device 20 allows for high-speed search by a range condition of spatio-temporal information, business operators can expect the effect that allows them to extend deployable services.

Modified Example of Embodiment 1

Figure 17:
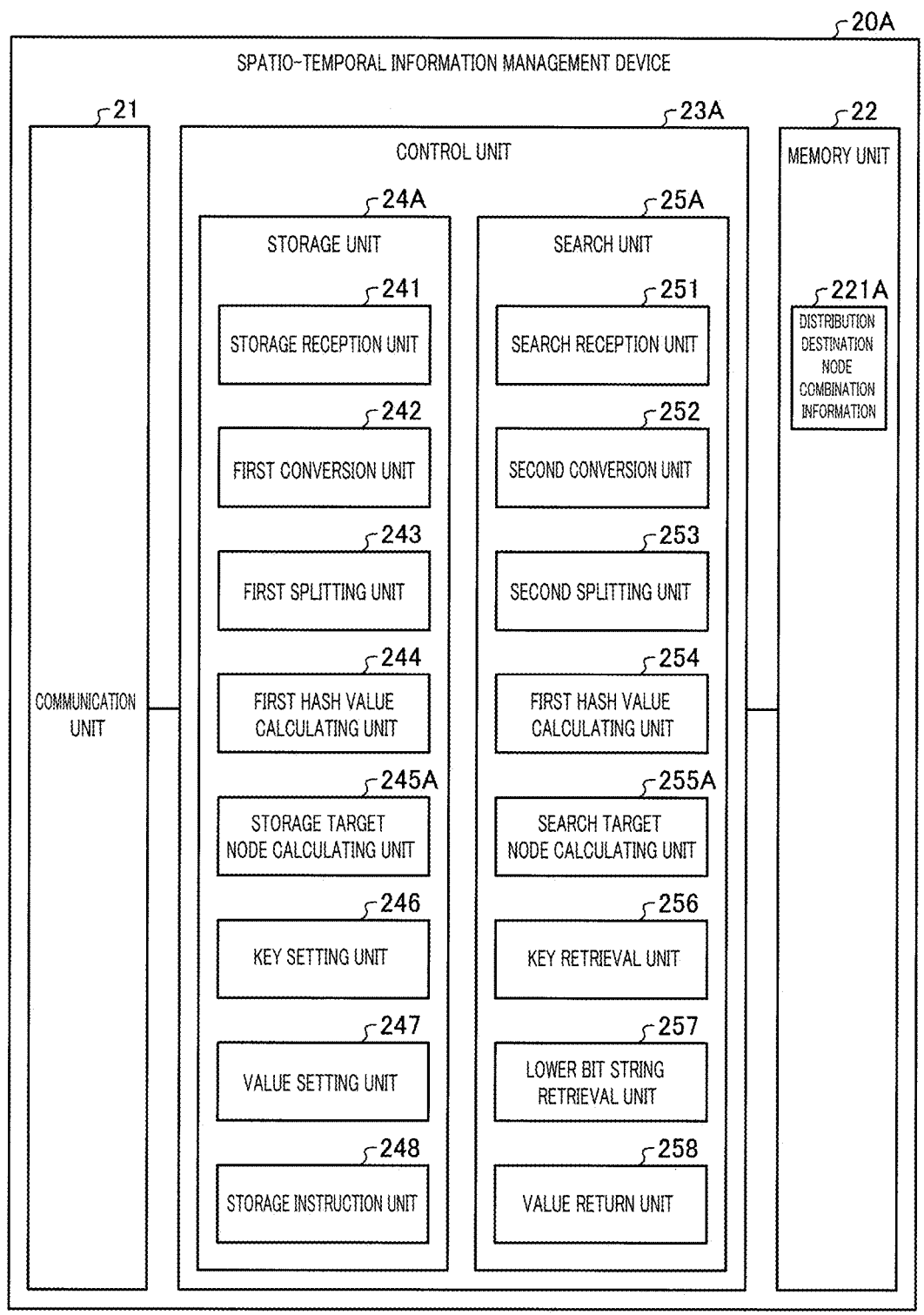
FIG. 17 is a diagram illustrating one example of a configuration of the spatio-temporal information management device according to a modified example of Embodiment 1.

Next, a modified example 1 of Embodiment will be described. FIG. 17 is a diagram illustrating one example of a configuration of the spatio-temporal information management device according to a modified example of Embodiment 1. As shown in FIG. 17, the spatio-temporal information management device 20A includes a control unit 23A instead of the control unit 23 of the spatio-temporal information management device 20 shown in FIG. 6. The spatio-temporal information management device 20A includes distribution destination node combination information 221A in the memory unit 22.

Figure 18:
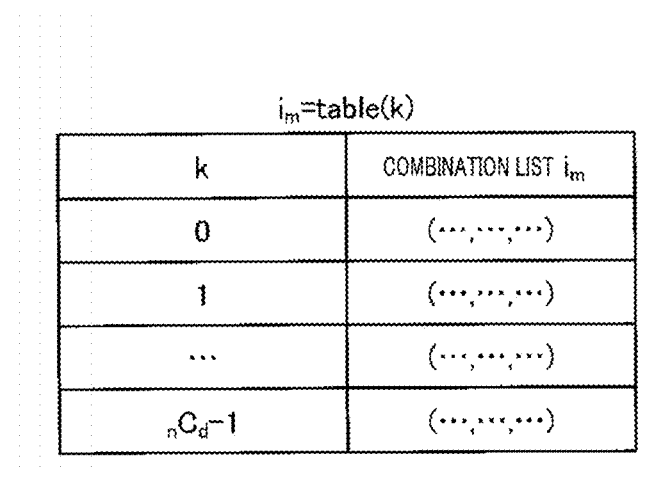

The distribution destination node combination information 221A is a table of combinations of storage target nodes prepared beforehand. FIG. 18 is a diagram illustrating one example of the data structure of distribution destination node combination information 221A. As shown in FIG. 18, the distribution destination node combination information 221A is a list where pattern numbers k (k=0, 1, 2, 3, . . . , $_nC_d-1$) are associated with combinations of distribution destination node numbers $i_m$. n represents the number of nodes, and d represents the number of storage target nodes.

The control unit 23A includes a storage unit 24A and a search unit 25A. The storage unit 24A includes a storage target node calculating unit 245A instead of the storage target node calculating unit 245 shown in FIG. 6. The storage target node calculating unit 245A selects a combination of distribution destination nodes. The storage target node calculating unit 245A selects a combination of distribution destination nodes using a hash value calculated by the first hash value calculating unit 244, with the upper bit string split by the first splitting unit 243 as the key.

More specifically, the storage target node calculating unit 245A calculates a pattern number k of the combination of distribution destination node numbers using Formula (3).

[Formula 3]

$$k = H(\text{Key}) \bmod {}_N C_D \quad (3)$$

k: Pattern number
H(Key): Hash value of key
N: Total number of nodes
D: Number of distribution destination nodes Next, the storage target node calculating unit 245A obtains the node number combination $i_m$ corresponding to the pattern number k from the distribution destination node combination information 221A, and calculates a storage target node from the nodes contained in the combination $i_m$ using Formula (4).

[Formula 4]

$$W = \text{rand}(i_m) \quad (4)$$

W: Storage target node number
rand( ): Random function
$i_m$: Distribution destination node number (=search target node number)

Similarly to the embodiment, the key setting unit 246, value setting unit 247, and storage instruction unit 248 cause the storage target node calculated by the storage target node calculating unit 245A to store the data.

The search unit 25A includes a search target node calculating unit 255A instead of the search target node calculating unit 255. The search target node calculating unit 255A selects a combination of search target nodes. Using the upper bit string split by the second splitting unit 253 as the key, the search target node calculating unit 255A calculates a combination of search target nodes by applying a hash value calculated by the second hash value calculating unit 254 to Formula (3).

More specifically, the storage target node calculating unit 245A calculates a pattern number k of the combination of distribution destination node numbers using Formula (3).

Next, the key setting unit 256 obtains the node number combination $i_m$ corresponding to the pattern number k from the distribution destination node combination information 221A, and retrieves the key that matches the upper bit string split by the second splitting unit 253 from the nodes contained in the combination $i_m$. Similarly to Embodiment 1, the lower bit string retrieval unit 257 retrieves a value having a prefix match with the lower bit string split by the second splitting unit from values of the key retrieved by the key retrieval unit 256. The value return unit 258 outputs the associated data contained in the value retrieved by the lower bit string retrieval unit 257 as a search result.

[Processing Steps of Storage Processing]

Figure 19:
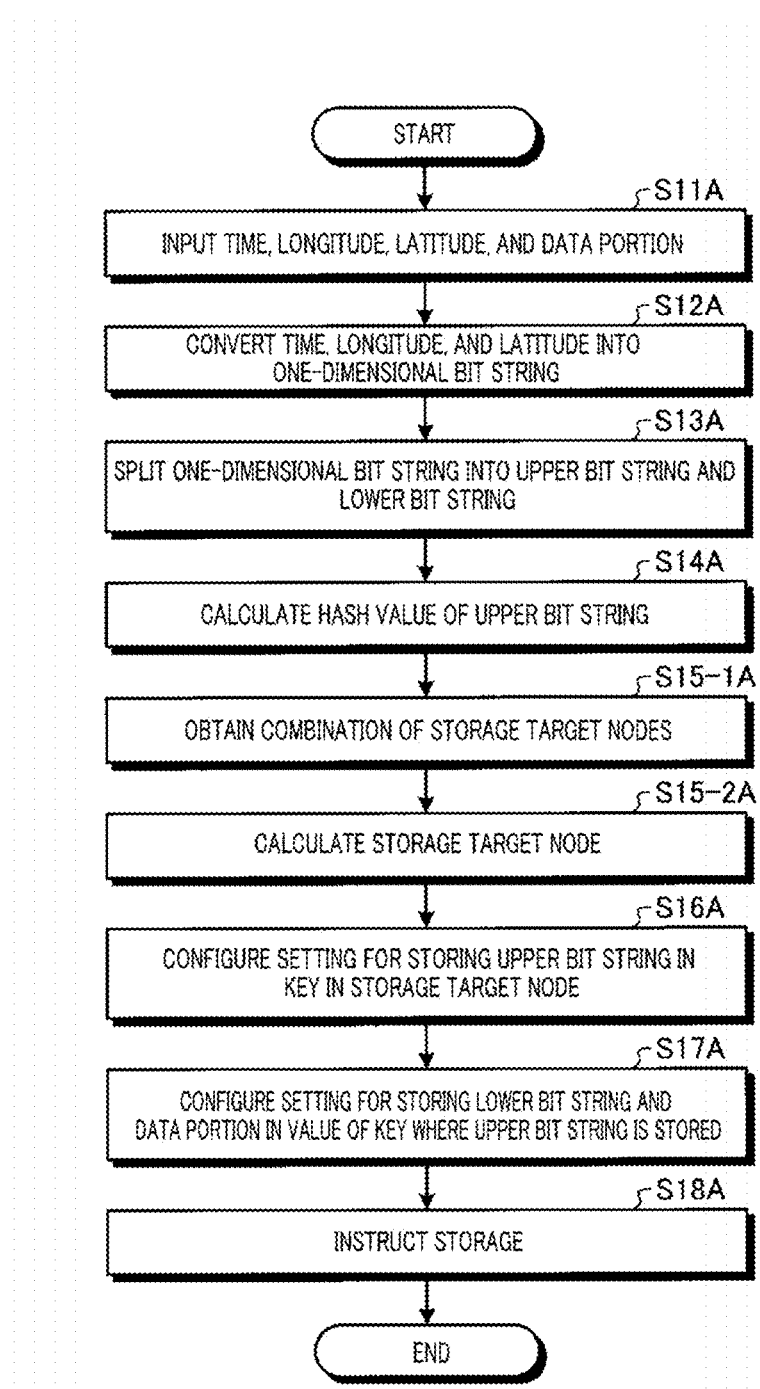
FIG. 19 is a flowchart showing the processing steps of the information storage processing performed by the spatio-temporal information management device shown in FIG. 17.

Next, the processing steps of the information storage processing performed by the spatio-temporal information management device 20A will be described. FIG. 19 is a flowchart showing the processing steps of the information storage processing performed by the spatio-temporal information management device 20A shown in FIG. 17. Step S11A to step S14A shown in FIG. 19 are the same as step S11 to step S14 shown in FIG. 11.

The storage target node calculating unit 245A obtains a pattern number k of a combination of distribution destination nodes using Formula (3) (step S15-1A). The storage target node calculating unit 245A then obtains the node number combination $i_m$ corresponding to the pattern number k from the distribution destination node combination information 221A, and calculates a storage target node from the nodes contained in the combination $i_m$ using Formula (4) (step S15-2A). Step S16A to step S18A shown in FIG. 19 are the same as step S16 to step S18 shown in FIG. 11.

[Processing Steps of Search Processing]

Figure 20:
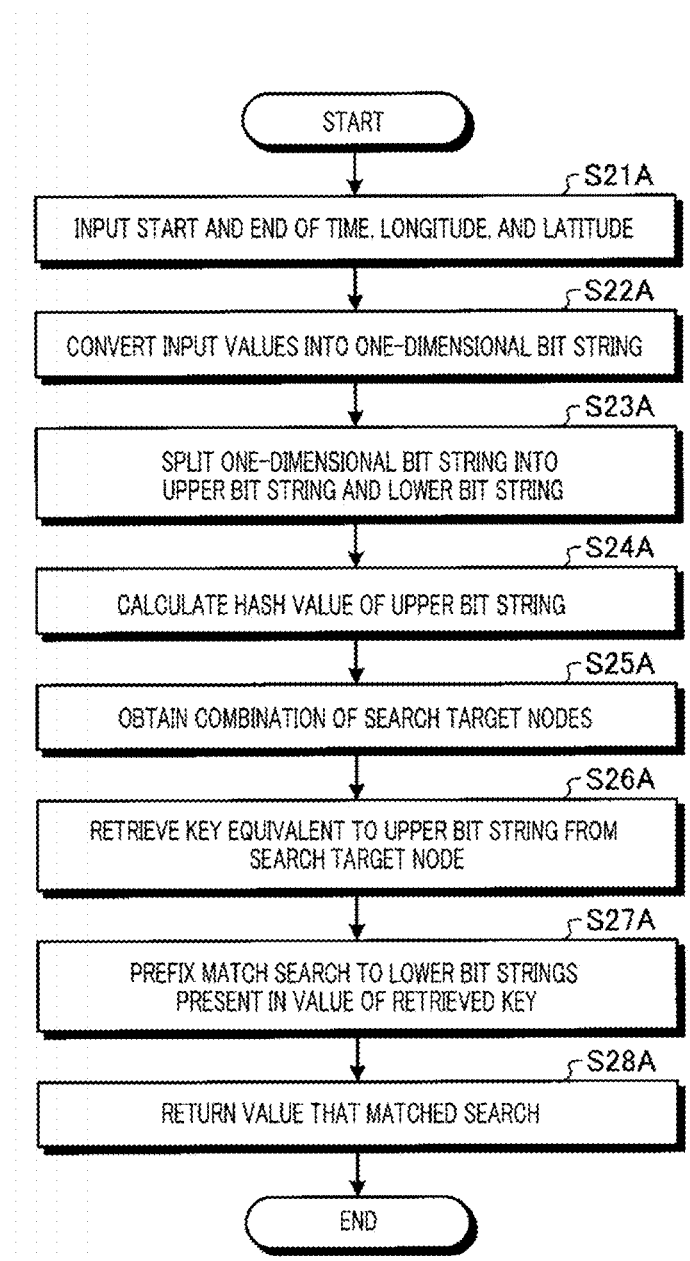
FIG. 20 is a flowchart showing the processing steps of the information search processing performed by the spatio-temporal information management device shown in FIG. 17.

Next, the processing steps of the information search processing performed by the spatio-temporal information management device 20A will be described. FIG. 20 is a flowchart showing the processing steps of the information search processing performed by the spatio-temporal information management device 20A shown in FIG. 17. Step S21A to step S24A shown in FIG. 20 are the same as step S21 to step S24 shown in FIG. 12.

The search target node calculating unit 255A obtains a combination of search target nodes based on the hash value calculated by the second hash value calculating unit 254 (step S25A). The search target node calculating unit 255A applies the hash value calculated by the second hash value calculating unit 254 to Formula (3) to calculate the pattern number k of the combination of search target nodes, and obtains the node number combination $i_m$ corresponding to the pattern number k from the distribution destination node combination information 221A.

The key retrieval unit 256 retrieves a key that matches (is equivalent to) the upper bit string split by the second splitting unit 253 from the combination of nodes determined by the search target node calculating unit 255A (step S26A). Step S27 and step S28 of FIG. 20 are the same as step S27 and step S28 of FIG. 12.

Effects of Modified Example of Embodiment 1

As described above, a table of combinations of storage target nodes is prepared beforehand in the spatio-temporal information management device 20, and when storing data, a node combination is selected based on the upper bit string value split by the first splitting unit 243 as the key, and data is stored in one of the selected nodes. When searching for data, the spatio-temporal information management device 20 determines the combination of search target nodes based on the upper bit string value split by the second splitting unit 253 as the key, and searches the determined combination of nodes.

Figure 21:
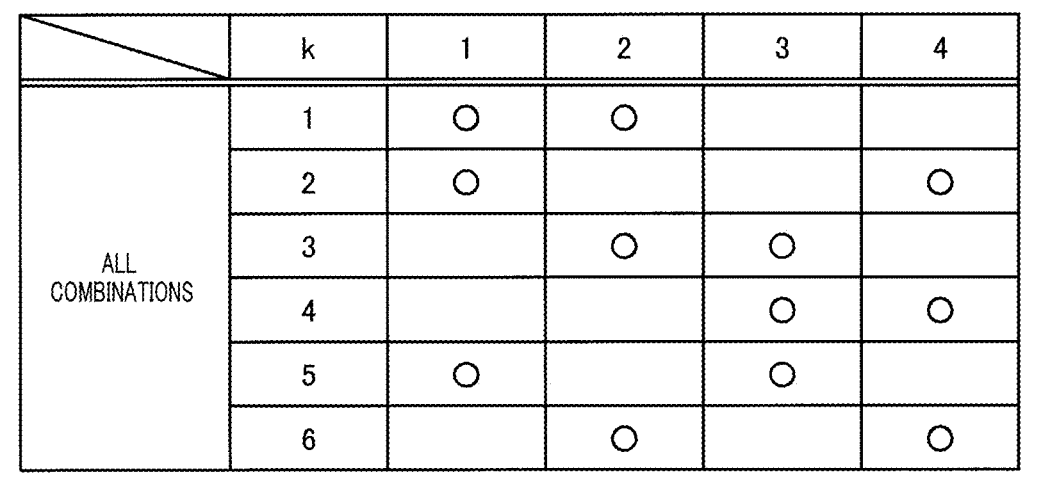

FIG. 21 is a diagram showing combinations of nodes that can be selected by the spatio-temporal information management device 20A shown in FIG. 17. FIG. 21 shows one example wherein N=4 and D=2. Since the spatio-temporal information management device 20A can select all the combinations of all the nodes as storage targets as shown in FIG. 21, the load can be evenly distributed across all the nodes. Also, since the spatio-temporal information management device 20A can obtain a search target node combination accurately, an appropriate search can be implemented.

Embodiment 2

Figure 22:
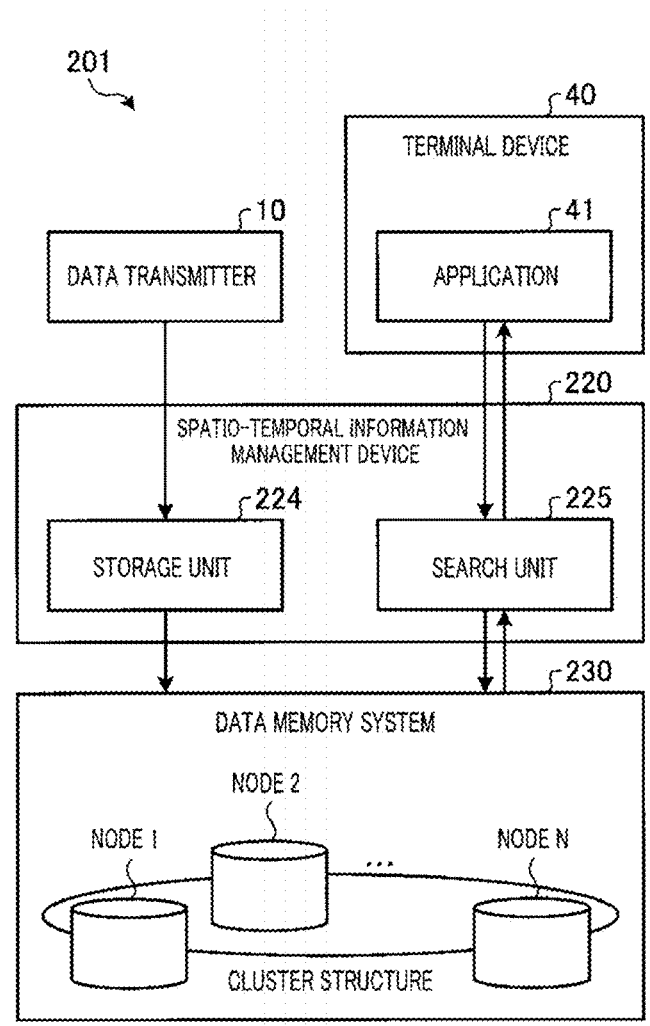
FIG. 22 is a diagram illustrating one example of a configuration of an information management system in Embodiment 2.

Embodiment 2 of the present invention will be described. FIG. 22 is a diagram illustrating one example of a configuration of an information management system in Embodiment 2.

As shown in FIG. 22, the information management system 201 according to Embodiment 2 includes a data memory system 230 in which a plurality of nodes 1 to N operate as a cluster structure. The information management system 201 has a spatio-temporal information management device 220 (information management device) including a storage unit 224 and a search unit 225. The spatio-temporal information management device 220 manages the acquired data transmitted from the data transmitter 10 (for example, the list L1 of FIG. 2) by storing the data in the data memory system 230. The spatio-temporal information management device 220 retrieves associated data associated with a range condition of spatio-temporal information of an object to be retrieved from the data stored in the data memory system 230 and outputs the associated data as a search result.

The storage unit 224 converts the spatio-temporal information in the storage object information into one-dimensional bit string, and splits the converted one-dimensional bit string into an upper bit string and a lower bit string. The storage unit 224 then calculates a label number for the storage object information, and causes the data memory system 230 to store the split upper bit string and label number in a key and to store the split lower bit string and associated data in a value of that key.

The search unit 225 outputs associated data associated with a range condition of spatio-temporal information of the object to be retrieved as a search result. The search unit 225 converts the range condition of spatio-temporal information of the object to be retrieved into one-dimensional bit string, and splits the converted one-dimensional bit string into an upper bit string and a lower bit string. The search unit 25 retrieves a key equivalent to the split upper bit string and the label number from the search target node, retrieves the value corresponding to the split lower bit string from values of the retrieved key, and outputs associated data contained in the retrieved value as a search result.

The data memory system 230 has a plurality of nodes 1 to N that are key-value stores and operate as a cluster structure. FIG. 23 is a diagram illustrating one example of a data structure of data stored in the data memory system 230 shown in FIG. 22. As shown in the list L22 of FIG. 23, it is assumed here that the data stored in the nodes 1 to N has a data structure known as a key-value type having secondary index portions.

More specifically, the nodes 1 to N store data in a structure with contents including node ID information, keys, and values, as shown in the list L22, similarly to the list L2 (see FIG. 3). The list L22 differs from the list 2 in that the key stores the upper bit string of the bit string converted from the spatio-temporal information and the label number.

As shown in the list L22, for example, node N1 stores "lower bit string 1" and "data1" in the secondary index portion and the data portion, respectively, of the value of the key where "upper bit string 1_label number" is stored.

[Configuration of Spatio-Temporal Information Management Device]

Figure 24:
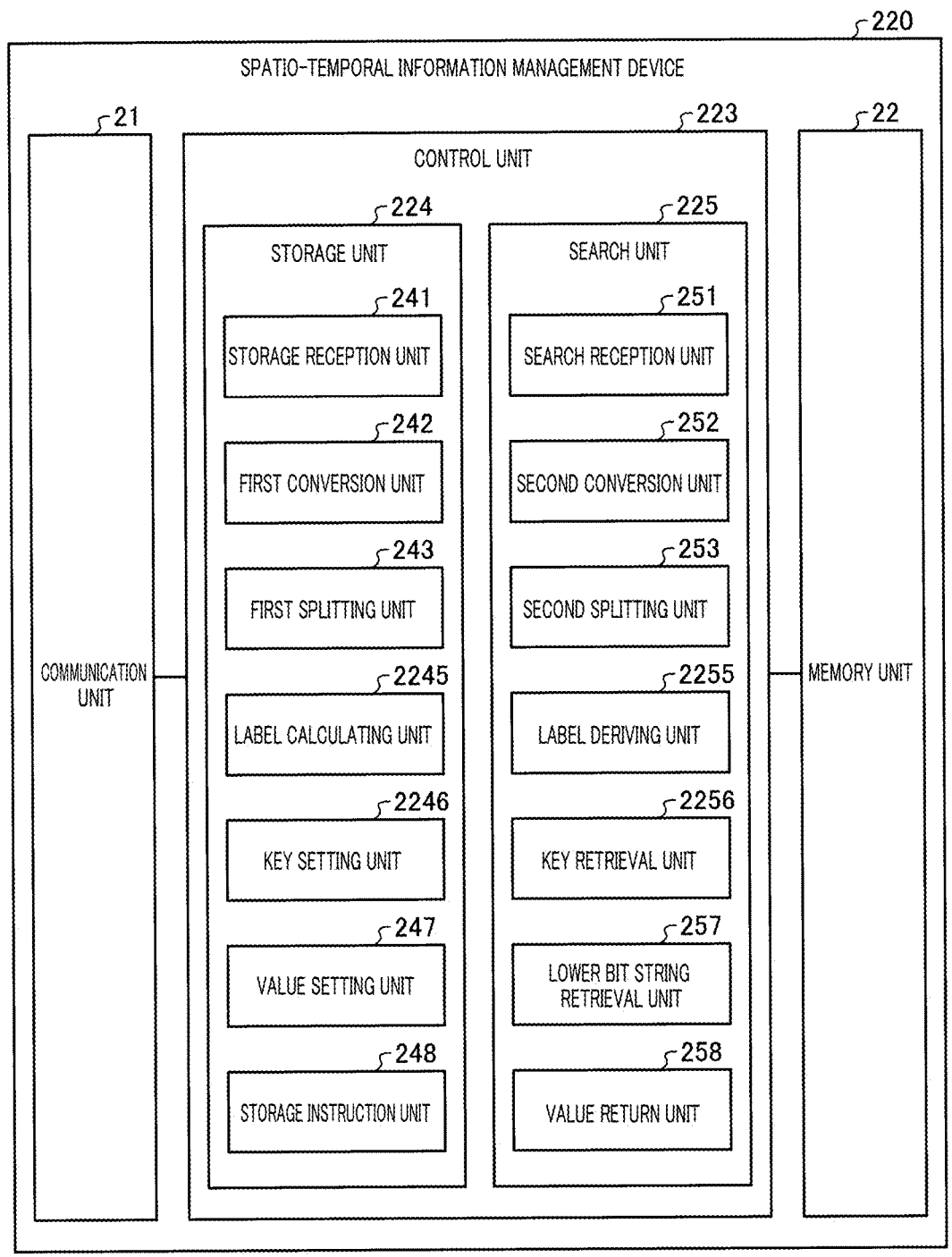
FIG. 24 is a diagram illustrating one example of a configuration of the spatio-temporal information management device shown in FIG. 22.

Next, the configuration of the spatio-temporal information management device 220 will be described. FIG. 24 is a diagram illustrating one example of the configuration of the spatio-temporal information management device 220 shown in FIG. 22. As shown in FIG. 24, the spatio-temporal information management device 220 includes a control unit 223 including a storage unit 224 and a search unit 225, as compared to the spatio-temporal information management device 20.

[Configuration of Storage Unit]

The storage unit 224 includes a storage reception unit 241, a first conversion unit 242, a first splitting unit 243, a label calculating unit 2245, a key setting unit 2246, a value setting unit 247, and a storage instruction unit 248. The storage reception unit 241, first conversion unit 242, first splitting unit 243, key setting unit 2246, value setting unit 247, and storage instruction unit 248 carry out the same processes as those of the first conversion unit 242, first splitting unit 243, value setting unit 247, and storage instruction unit 248 shown in FIG. 6. The value of D, which is the number of nodes, is a variable, and already defined when data is stored.

The label calculating unit 2245 calculates a label number that is to be stored in the key with the upper bit string split by the first splitting unit 243. The label calculating unit 2245 calculates the label number using Formula (5).

[Formula 5]

$$L = \text{rand}(\ ) \% D \quad (5)$$

L: Label number
rand( ): Random 32-bit integer
D: Number of distribution destination nodes The key setting unit 2246 configures a setting for storing the upper bit string split by the first splitting unit 243 and the label number calculated by the label calculating unit 2245 as one set in the key in the data memory system 230. The value setting unit 247 configures a setting for storing the lower bit string split by the first splitting unit 243 and associated data in the value of the key set by the key setting unit 2246 among the keys in the storage target node. The storage instruction unit 248 causes the storage target node to store the data in accordance with the settings by the key setting 246 unit and value setting unit 247.

The storage unit 224 determines the label number in this way by using Formula (5), and the determined label number is associated with the upper bit string and stored in the key.

[Configuration of Search Unit]

Next, the search unit 225 will be described. The search unit 225 includes a search reception unit 251, a second conversion unit 252, a second splitting unit 253, a label deriving unit 2255, a key retrieval unit 2256, a lower bit string retrieval unit 257, and a value return unit (output unit) 258. The search reception unit 251, second conversion unit 252, second splitting unit 253, lower bit string retrieval unit 257, and value return unit 258 carry out the same processes as those of the search reception unit 251, second conversion unit 252, second splitting unit 253, lower bit string retrieval unit 257, and value return unit 258 shown in FIG. 6.

The label deriving unit 2255 derives the label number of the object to be retrieved from the value of D that was defined when data was stored.

The key retrieval unit 2256 retrieves a key that matches the upper bit string split by the second splitting unit 253 and the label number from the data management system 230. The lower bit string retrieval unit 257 retrieves a value having a prefix match with the lower bit string split by the second splitting unit from values of the key retrieved by the key retrieval unit 2256. The value return unit 258 outputs the associated data contained in the value retrieved by the lower bit string retrieval unit 257 as a search result.

[Flow of Processing in Storage Unit]

Figure 25:
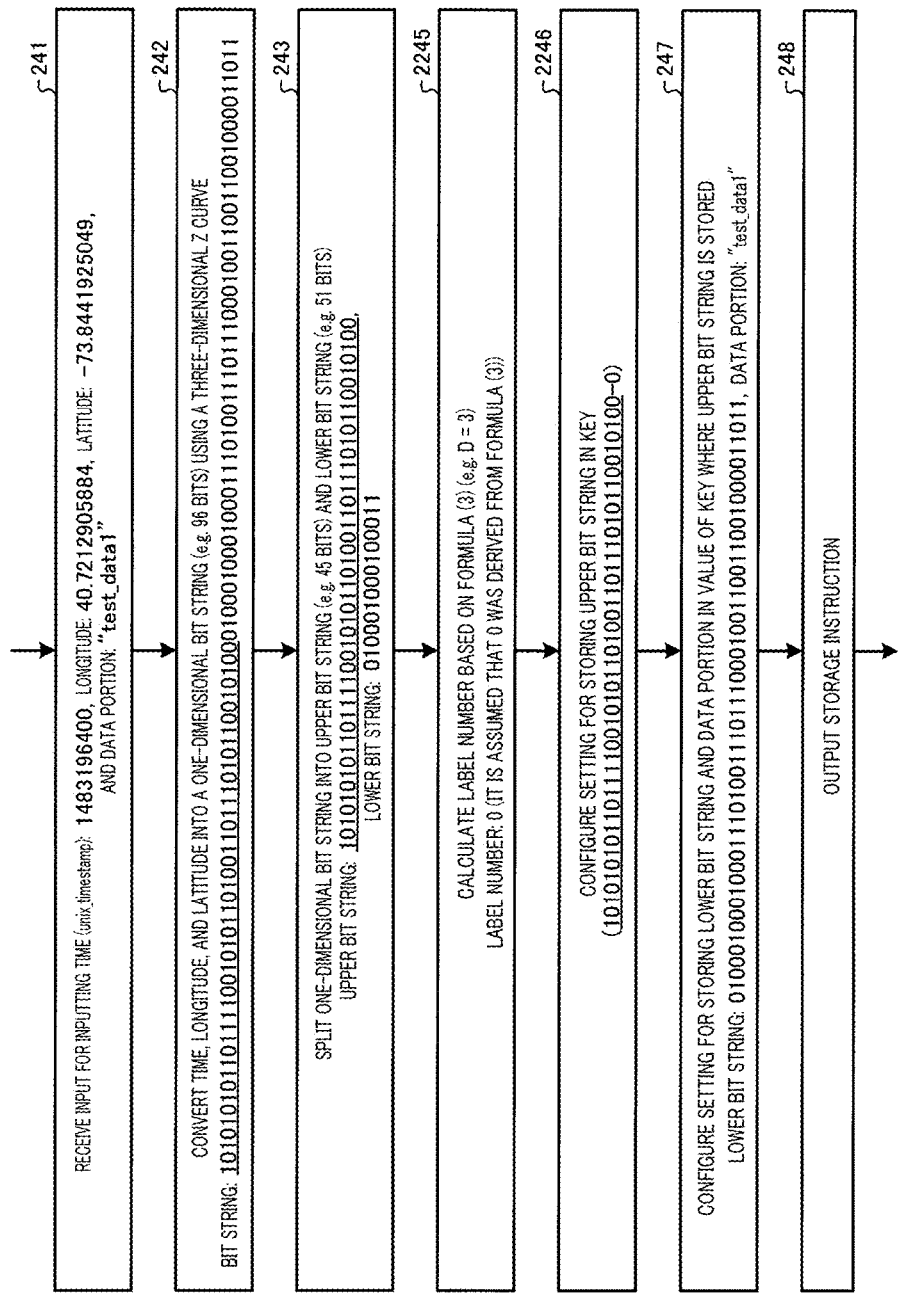
FIG. 25 is a diagram explaining the flow of processing in the storage unit shown in FIG. 24.

Next, the flow of the processing in the storage unit 224 will be described in more specific terms with reference to FIG. 25. FIG. 25 is a diagram explaining the flow of the processing in the storage unit 224 shown in FIG. 24.

One case will be described here, where, as shown in FIG. 25, the storage reception unit 241 has received an input of data "time (unix_timestamp): 1483196400, longitude: 40.7212905884, latitude: −73.8441925049, data portion: "test_data1"", for example.

In this case, the first conversion unit 242 converts the time "1483196400", longitude "40.7212905884", and latitude "−73.8441925049" into a one-dimensional bit string (e.g. 96 bits), using a three-dimensional Z curve. The obtained one-dimensional bit string is "101010101101111001010110100110111010110010100-01000100001000111 010011101110001001100110010000011011".

Next, the first splitting unit 243 splits the one-dimensional bit string into an upper bit string (e.g. 45 bits) and a lower bit string (e.g. 51 bits). More specifically, the first splitting unit 243 splits "101010101101111001010110100110111010110010100-000100010001000111 010011101110001001100110010000011011" into a 45-bit string "101010101101111001010110100110111010110010100" and a 51-bit string "01000100010-0011101001110111000100110011001000011011" as the upper bit string and the lower bit string, respectively.

Next, the label calculating unit 2245 calculates a label number based on Formula (5). Here, it is assumed that D=3, for example, and the label number L in this case is L=0, selected from L=0, L=1, or L=2.

The key setting unit 2246 configures a setting for storing the upper bit string and the label number "101010101101111001010110100110111010110010100-0" in the key in the data memory system 230. The value setting unit 247 configures a setting for storing the lower bit string "010001000100011101001101111000100110011001000-011011" and "test_data1" in the secondary index portion and the data portion, respectively, of the value of the key "101010101101111001010110100110111010110010100-0". The storage instruction unit 248 thus causes the data memory system 230 to store the data in accordance with the settings by the key setting unit 2246 and value setting unit 247.

FIG. 26 is a diagram explaining a data retention format in the data memory system 230 shown in FIG. 22. As shown in the list L22a of FIG. 26, "101010101101111001010110100110111010110010100-0" is stored in the key in the node "1" in accordance with the settings by the storage unit 224 shown in FIG. 24. As shown in the list L22a, "01000100010001-1101001110111000100110011001000011011" and "test_data1" are stored in the secondary index portion and the data portion, respectively, of the value of this key "101010101101111001010110100110111010110010100-0".

[Flow of Processing in Search Unit]

Figure 27:
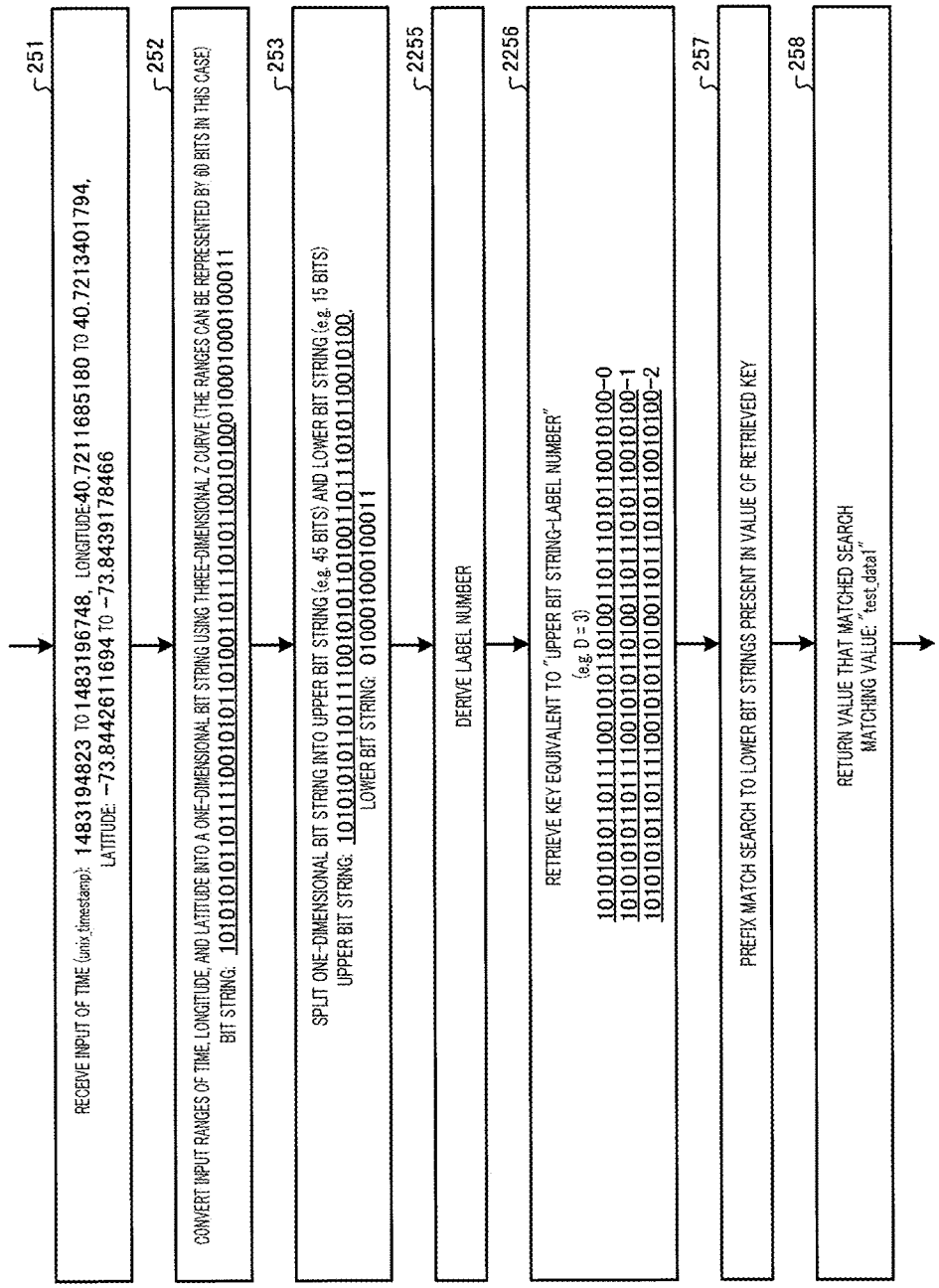
FIG. 27 is a diagram explaining the flow of processing in the search unit shown in FIG. 24.
Figure 28:
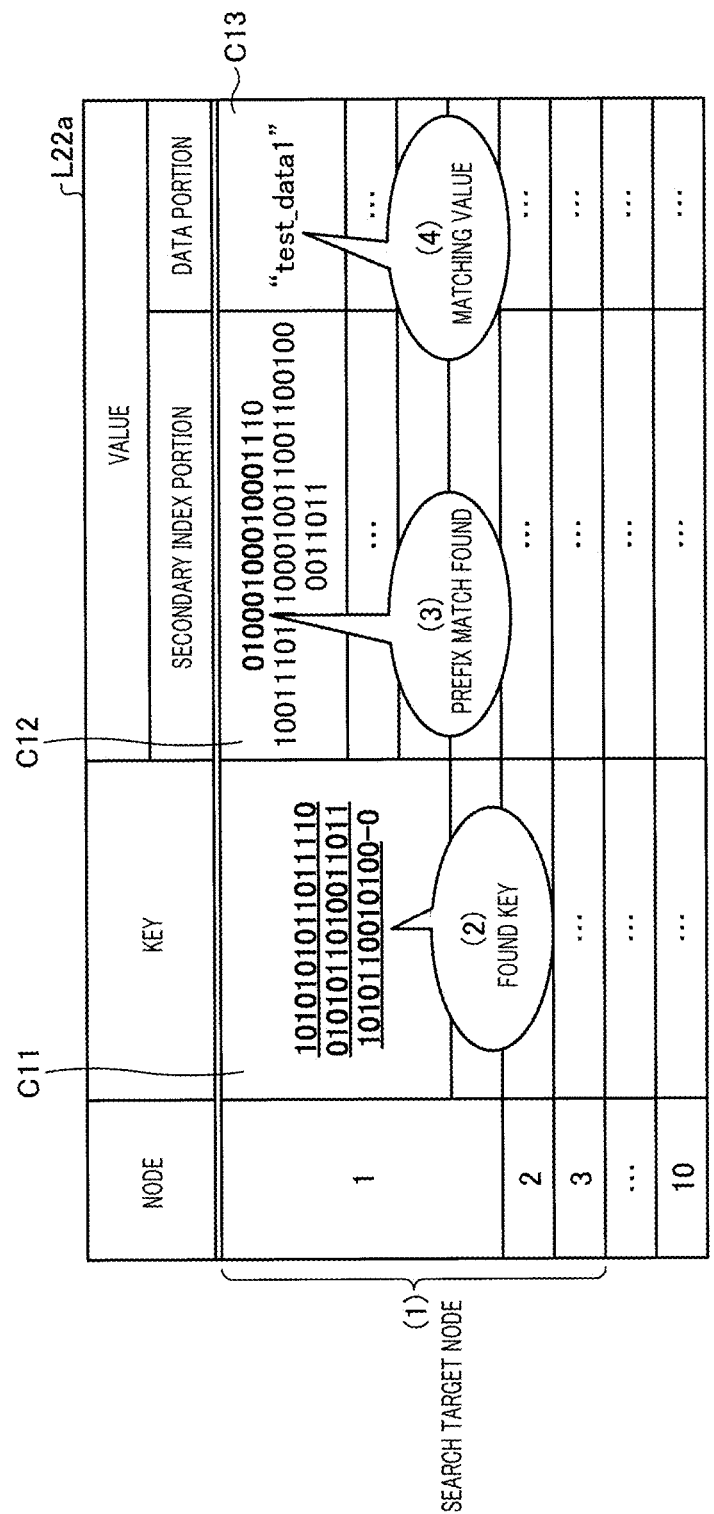
FIG. 28 is a diagram explaining a data retention format in the data memory system shown in FIG. 22.

Next, the flow of the processing in the search unit 225 will be described in more specific terms with reference to FIG. 27. FIG. 27 is a diagram explaining the flow of the processing in the search unit 225 shown in FIG. 24. FIG. 28 is a diagram explaining a data retention format in the data memory system 230 shown in FIG. 22.

One case will be described here, where, as shown in FIG. 27, the search reception unit 251 has received an input of a search condition "time (unix_timestamp): 1483194823 to 1483196748, longitude: 40.7211685180 to 40.7213401794, latitude: −73.8442611694 to −73.8439178466", for example.

In this case, the second conversion unit 252 converts the input ranges of time "1483194823 to 1483196748", longitude "40.7211685180 to 40.7213401794", and latitude "−73.8442611694 to −73.8439178466" into a one-dimensional bit string, using a three-dimensional Z curve. In this example, the ranges can be represented by 60 bits, and the second conversion unit 252 can obtain a bit string "101010101101111001010110100110111101011001010-0010001000100011".

Next, the second splitting unit 253 splits the one-dimensional bit string into an upper bit string (e.g. 45 bits) and a lower bit string (e.g. 51 bits). More specifically, the second splitting unit 253 splits "101010101101111001010110100110111101011001010-0010001000100011" into a 45-bit string "101010101101111001010110100110111010110010100" and a 15-bit string "010001000100011" as the upper bit string and the lower bit string, respectively.

The label deriving unit 2255 derives the label number of the object to be retrieved from the value of D. The key retrieval unit 2256 searches the data memory system 230 for a key that matches the upper bit string split and the label number. For example, when D=3, keys "101010101101111001010110100110111010110010100-0", "101010101101111001010110100110111010110010100-1", and "101010101101111001010110100110111010110010100-2" are retrieved. As a result, as shown in the list L22a, the key in the field C11 of the node "1" is retrieved as the found key (see (1) and (2) in FIG. 28).

Next, the lower bit string retrieval unit 257 searches the value of the key retrieved by the key retrieval unit 256 for a secondary index portion having a prefix match with the lower bit string "010001000100011". As a result, the field C12 having a prefix match with the lower bit string "010001000100011" is retrieved as the found value (see (3) in FIG. 28) from the values corresponding to the key in the field C11 of the node "1".

The value return unit 258 returns the data "test_data1" (see field C13 in FIG. 28) in the data portion corresponding to the secondary index portion in the field C12 retrieved by the lower bit string retrieval unit 257 as a value matching the search to the terminal device 40 (see (4) in FIG. 28).

[Processing Steps of Storage Processing]

Figure 29:
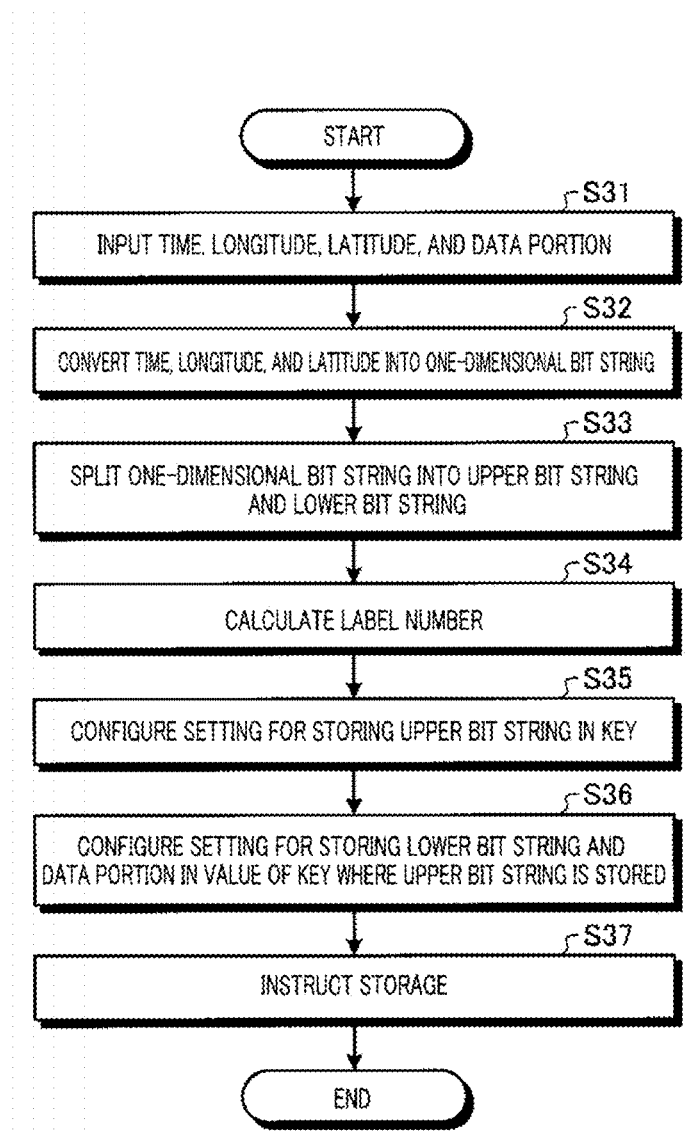
FIG. 29 is a flowchart showing the processing steps of the information storage processing performed by the spatio-temporal information management device shown in FIG. 24.

Next, the processing steps of the information storage processing performed by the spatio-temporal information management device 220 will be described. FIG. 29 is a flowchart showing the processing steps of the information storage processing performed by the spatio-temporal information management device 220 shown in FIG. 24.

Step S31 to step S33 shown in FIG. 29 are the same as step S11 to step S13 shown in FIG. 11. The label calculating unit 2245 calculates a label number that is to be stored in the key with the upper bit string split by the first splitting unit 243, using Formula (5) (step S34). The key setting unit 2246 configures a setting for storing the upper bit string split by the first splitting unit 243 and the label number calculated by the label calculating unit 2245 as one set in the key in the data memory system 230 (step S35). Step S36 and step S37 shown in FIG. 29 are the same as step S17 and step S18 shown in FIG. 11.

[Processing Steps of Search Processing]

Figure 30:
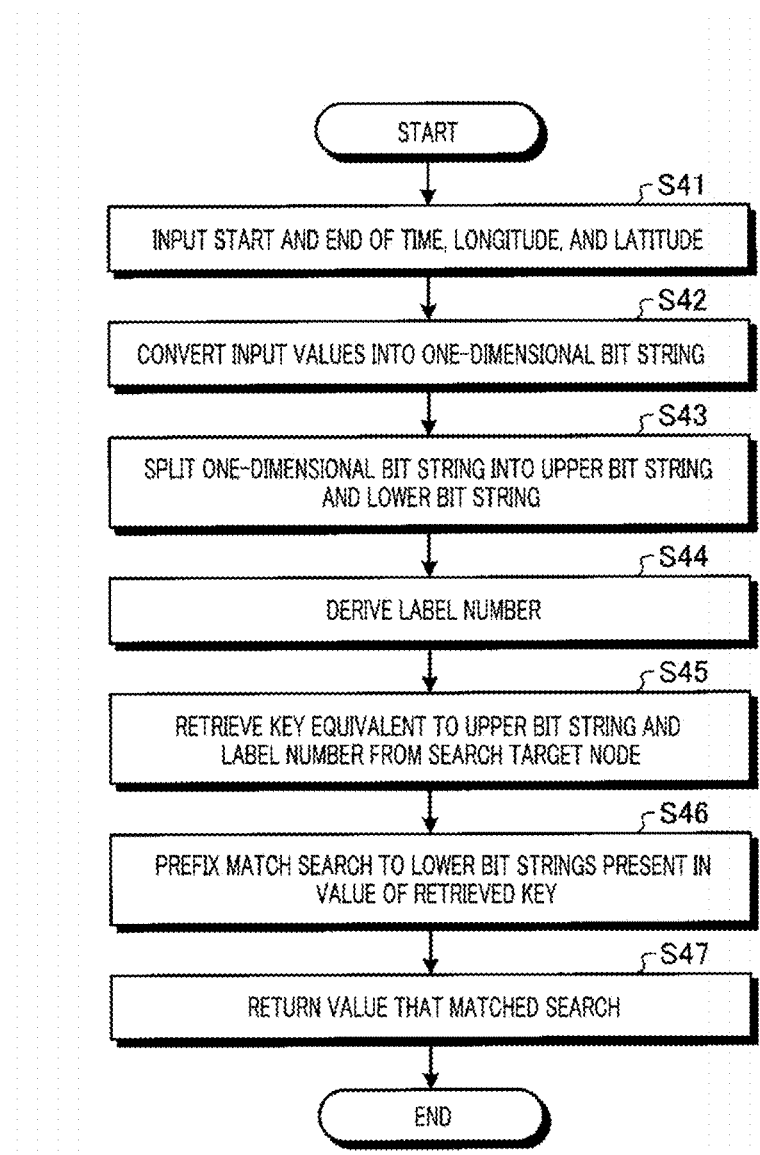
FIG. 30 is a flowchart showing the processing steps of the information search processing performed by the spatio-temporal information management device shown in FIG. 24.

Next, the processing steps of the information search processing performed by the spatio-temporal information management device 220 will be described. FIG. 30 is a flowchart showing the processing steps of the information search processing performed by the spatio-temporal information management device 220 shown in FIG. 24.

Step S41 to step S43 shown in FIG. 30 are the same as step S21 to step S23 shown in FIG. 12. The label deriving unit 2255 derives the label number of the object to be retrieved from the value of D (step S44).

The key retrieval unit 2256 retrieves a key equivalent to the upper bit string split by the second splitting unit 253 and the label number from the data memory system 230 (step S45). Step S46 and step S47 shown in FIG. 30 are the same as step S27 and step S28 shown in FIG. 12.

By carrying out these processing steps of Embodiment 2, the invention can be applied also to the data memory system 230 in which a plurality of nodes 1 to N operate as a cluster structure, so that data can be distributed and stored across the plurality of nodes and imbalance in the load among the loads can be alleviated.

[System Configuration and Others]

The illustrated constituent elements of respective devices each represent their notional functions and these elements need not necessarily be physically configured as illustrated in the drawings. Namely, the specific embodiment of distribution or integration of various devices is not limited to those illustrated in the drawings, and all or some of the devices can be functionally or physically distributed or integrated in any suitable unit depending on various loads and operating conditions. Furthermore, all or some of various processing functions carried out by the respective devices may be implemented by a CPU and programs that the CPU analyzes and executes, or implemented as hardware by wired logic.

In the various processes described in the embodiments, all or some of the processes described as being performed automatically may be carried out manually, or all or some of the processes described as being carried out manually may be performed automatically with a known method. The processing steps, control steps, specific names, and information containing various data and parameters that are presented in the foregoing and in the drawings may be changed in any desirable manner unless otherwise specified.

[Program]

Figure 31:
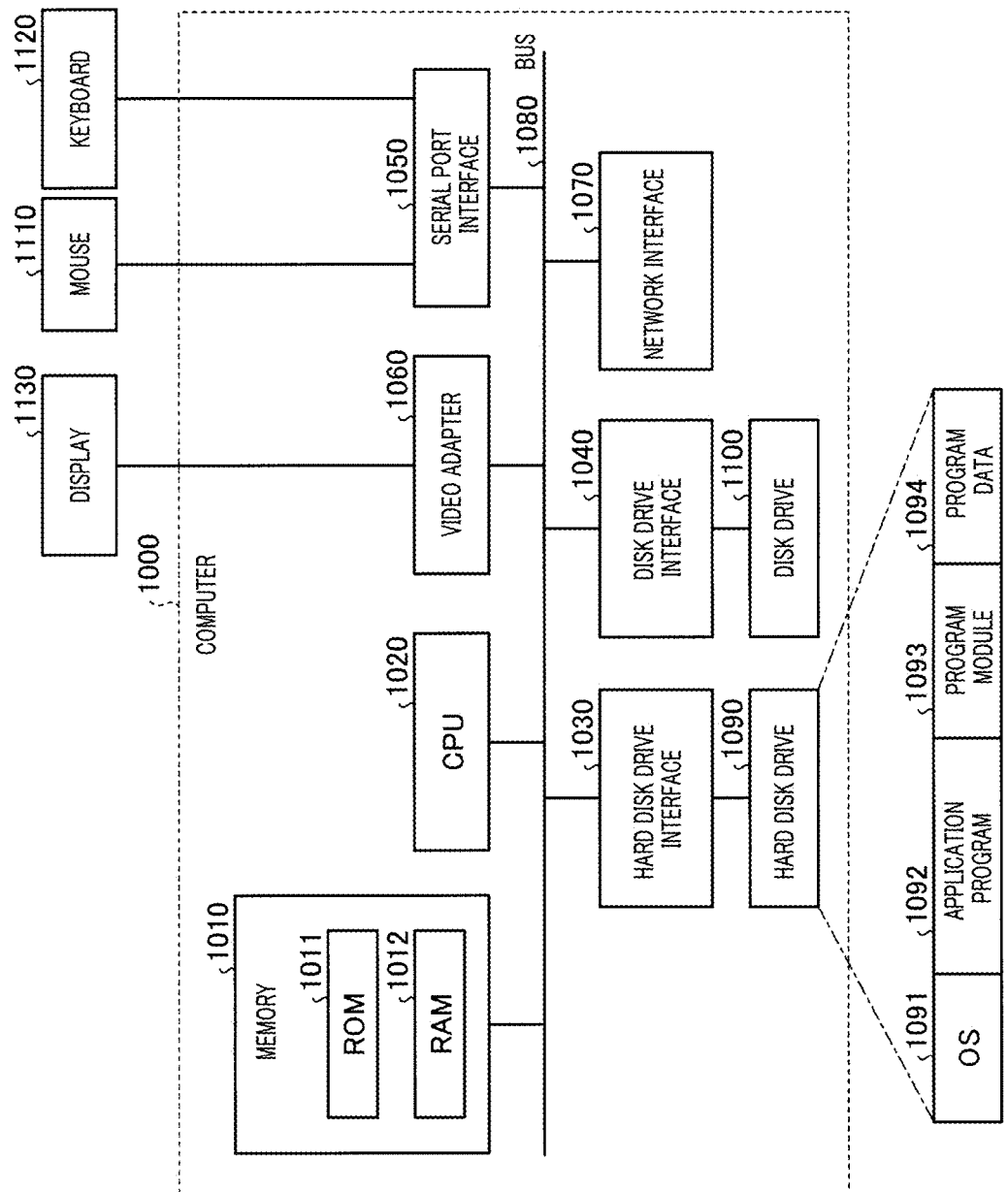
FIG. 31 is a diagram illustrating one example of a computer in which the spatio-temporal information management device is implemented by a program being executed.

FIG. 31 is a diagram illustrating one example of a computer in which the spatio-temporal information management device 20 is implemented by a program being executed. The computer 1000 has a memory 1010 and a CPU 1020, for example. The computer 1000 also includes a hard disk drive interface 1030, a disk drive interface 1040, a serial port interface 1050, a video adapter 1060, and a network interface 1070. These components are connected to each other via buses 1080.

The memory 1010 includes a ROM (Read Only Memory) 1011 and a RAM 1012. The ROM 1011 stores a boot program such as BIOS (Basic Input Output System), for example. The hard disk drive interface 1030 is connected to the hard disk drive 1090. The disk drive interface 1040 is connected to the disk drive 1100. A removable storage medium such as a magnetic disc or an optical disc, for example, is inserted into the disk drive 1100. The serial port interface 1050 is connected to a mouse 1110 and a keyboard 1120, for example. The video adapter 1060 is connected to a display 1130, for example.

The hard disk drive 1090 stores an OS (Operating System) 1091, an application program 1092, a program module 1093, and program data 1094. Namely, the programs that define various processes in the spatio-temporal information management device 20 are mounted as a program module 1093 in which computer-executable codes are written. The program module 1093 is stored in the hard disk drive 1090, for example. For example, the program module 1093 for executing processes similar to the functional configurations in the spatio-temporal information management device 20 are stored in the hard disk drive 1090. The hard disk drive 1090 may be substituted with an SSD (Solid State Drive).

Setting data used in the processes of the embodiments described above is stored as program data 1094 in the memory 1010 or hard disk drive 1090, for example. The CPU 1020 reads out the program module 1093 and program data 1094 stored in the memory 1010 or hard disk drive 1090 to the RAM 1012 as required and executes the program.

The program module 1093 and program data 1094 may not necessarily be stored in the hard disk drive 1090 but may be stored in a removable storage medium, and read out by the CPU 1020 via the disk drive 1100 or the like. Alternatively, the program module 1093 and program data 1094 may be stored in another computer connected via a network (such as LAN or WAN (Wide Area Network)). The program module 1093 and program data 1094 may be read out by the CPU 1020 from another computer via the network interface 1070.

While embodiments to which the invention made by the inventors was applied have been described above, the present invention shall not be limited by the description and drawings of the embodiments that form part of the disclosure of the present invention. Namely, other embodiments, examples, and operational techniques carried out by a person skilled in the art based on the embodiments are all included in the scope of the present invention.

REFERENCE SIGNS LIST 1, 201 Information management system
10 Data transmitter
20, 20A, 220 Spatio-temporal information management device
21 Communication unit
22 Memory unit
23, 23A, 223 Control unit
24, 24A, 224 Storage unit
25, 25A, 225 Search unit
30, 230 Data memory system
40 Terminal device
41 Application
221A Distribution destination node combination information
241 Storage reception unit
242 First conversion unit
243 First splitting unit
244 First hash value calculating unit
245, 245A Storage target node calculating unit
246, 2246 Key setting unit
247 Value setting unit
248 Storage instruction unit
251 Search reception unit
252 Second conversion unit
253 Second splitting unit
254 Second hash value calculating unit
255, 255A Search target node calculating unit
256, 2256 Key retrieval unit
257 Lower bit string retrieval unit
258 Value return unit
2245 Label calculating unit
2255 Label deriving unit

The invention claimed is:

1. An information management device that manages spatio-temporal information including time information and position information as well as associated data associated with the spatio-temporal information by distributing the spatio-temporal information and associated data across a plurality of nodes that are key-value stores, the device comprising:

a memory; and
processing circuitry coupled to the memory and configured to:
convert said spatio-temporal information in storage object information into a one-dimensional bit string, split the converted one-dimensional bit string into an upper bit string and a lower bit string, and cause a storage target node to store at least the split upper bit string in a key and to store the split lower bit string and said associated data in a value of that key, and
convert a range condition of spatio-temporal information of an object to be retrieved into one-dimensional bit string, split the converted one-dimensional bit string into an upper bit string and a lower bit string, retrieve a key from a search target node using at least the split upper bit string, retrieve a value corresponding to the split lower bit string from values of the retrieved key, and output associated data contained in the retrieved value as a search result.

2. The information management device according to claim 1, wherein the processing circuitry is further configured to:

convert said spatio-temporal information in said storage object information into a one-dimensional bit string, split the one-dimensional bit string converted at the converting into an upper bit string and a lower bit string, calculate a hash value of the upper bit string split at the splitting, select a storage target node based on the hash value calculated at the calculating, configure a setting for storing the upper bit string split at the splitting in a key in said storage target node, configure a setting for storing the lower bit string split at the splitting and said associated data in a value of the key set at the setting among keys in said storage target node, and cause said storage target node to store data in accordance with settings.

3. The information management device according to claim 1, wherein the processing circuitry is further configured to:

convert a range condition of spatio-temporal information of an object to be retrieved into a one-dimensional bit string, split the one-dimensional bit string converted at the converting into an upper bit string and a lower bit string, calculate a hash value of the upper bit string split at the splitting, determine a search target node based on the hash value calculated at the calculating, retrieve a key that matches the upper bit string split at the splitting from said search target node, retrieve a value having a prefix match with the lower bit string split at the splitting from values of the key retrieved at the retrieving, and output associated data contained in the value retrieved at the retrieving as a search result.

4. The information management device according to claim 1, wherein said plurality of nodes operate as a cluster structure, and the processing circuitry is further configured to:

convert said spatio-temporal information in said storage object information into a one-dimensional bit string, split the one-dimensional bit string converted at the converting into an upper bit string and a lower bit string, calculate a label number that is to be stored in a key with the upper bit string split at the splitting, configure a setting for storing the upper bit string split at the splitting and the label number calculated at the calculating in a key in one of a plurality of nodes operating as said cluster structure, configure a setting for storing the lower bit string split at the splitting and said associated data in a value of the key set at the setting among keys in said storage target node, and cause said storage target node to store data in accordance with settings.

5. The information management device according to claim 4, wherein the processing circuitry is further configured to:

convert a range condition of spatio-temporal information of an object to be retrieved into a one-dimensional bit string, split the one-dimensional bit string converted at the converting into an upper bit string and a lower bit string, derive a label number of the object to be retrieved, retrieve a key that matches the upper bit string split at the splitting and the label number calculated at the deriving from a plurality of nodes operating as said cluster structure, retrieve a value having a prefix match with the lower bit string split at the splitting from values of the key retrieved at the retrieving, and output associated data contained in the value retrieved at the retrieving as a search result.

6. An information management method executed by an information management device that manages spatio-temporal information including time information and position information as well as associated data associated with the spatio-temporal information by distributing the spatio-temporal information and associated data across a plurality of nodes that are key-value stores, the method comprising:

converting said spatio-temporal information in storage object information into a one-dimensional bit string, splitting at least the converted one-dimensional bit string into an upper bit string and a lower bit string, and causing a storage target node to store the split upper bit string in a key and to store the split lower bit string and said associated data in a value of that key; and converting a range condition of spatio-temporal information of an object to be retrieved into one-dimensional bit string, splitting the converted one-dimensional bit string into an upper bit string and a lower bit string, retrieving a key from a search target node using at least the split upper bit string, retrieving a value corresponding to the split lower bit string from values of the retrieved key, and outputting associated data contained in the retrieved value as a search result.

7. A non-transitory computer-readable recording medium storing therein an information management program for causing a computer to execute a process comprising:

converting spatio-temporal information including time information and position information of storage object information that includes spatio-temporal information and associated data associated with the spatio-temporal information, into a one-dimensional bit string, splitting the converted one-dimensional bit string into an upper bit string and a lower bit string, and causing a storage target node that is a key-value store to store at least the split upper bit string in a key and to store the split lower bit string and said associated data in a value of that key; and converting a range condition of spatio-temporal information of an object to be retrieved into one-dimensional bit string, splitting the converted one-dimensional bit string into an upper bit string and a lower bit string, retrieving a key from a search target node using at least the split upper bit string, retrieving a value corresponding to the split lower bit string from values of the retrieved key, and outputting associated data contained in the retrieved value as a search result.

* * * * *